United States Patent
Moore

(10) Patent No.: US 8,028,298 B2
(45) Date of Patent: Sep. 27, 2011

(54) SYSTEMS AND METHODS FOR MANAGING SHARED RESOURCES IN A COMPUTER SYSTEM

(75) Inventor: Mark Justin Moore, Cambridge (GB)

(73) Assignee: Conexant Systems, Inc., Newport Beach, CA (US)

( * ) Notice: Subject to any disclaimer, the term of this patent is extended or adjusted under 35 U.S.C. 154(b) by 1351 days.

(21) Appl. No.: 10/642,309

(22) Filed: Aug. 18, 2003
(Under 37 CFR 1.47)

(65) Prior Publication Data

US 2006/0168589 A1    Jul. 27, 2006

Related U.S. Application Data

(60) Provisional application No. 60/403,660, filed on Aug. 16, 2002.

(51) Int. Cl.
    *G06F 9/44*      (2006.01)
    *G06F 9/46*      (2006.01)
    *G06F 13/00*      (2006.01)

(52) U.S. Cl. .................................... 719/315; 719/314
(58) Field of Classification Search ........... 719/314–315
See application file for complete search history.

(56) References Cited

U.S. PATENT DOCUMENTS

| | | | |
|---|---|---|---|
| 5,404,529 A | 4/1995 | Chernikoff et al. | |
| 5,995,916 A * | 11/1999 | Nixon et al. | 702/182 |
| 6,122,663 A | 9/2000 | Lin et al. | |
| 6,179,489 B1 | 1/2001 | So et al. | |
| 6,253,252 B1 | 6/2001 | Schofield | |
| 6,298,370 B1 | 10/2001 | Tang et al. | |
| 6,324,620 B1 * | 11/2001 | Christenson et al. | 711/112 |
| 6,430,627 B1 * | 8/2002 | Utas | 719/318 |
| 6,553,438 B1 * | 4/2003 | Coffman et al. | 710/52 |
| 6,643,633 B2 | 11/2003 | Chau et al. | |
| 2003/0126196 A1 * | 7/2003 | Lagimonier et al. | 709/203 |

OTHER PUBLICATIONS

Silberschatz et al., "Applied Operating System Concepts," First Edition, John Wiley & Sons, Inc., 2000; pp. 36-37, 77-82, 95-113, 567-574, 706-708, 719-735, 751-758.*
Jaworski, Jamie, "JAVA 1.1 Developer's Guide," Second Edition, Sams.net Publishing, 1997; pp. 90-96.*
"Microsoft Computer Dictionary," Fifth Edition, Microsoft Press, 2002; pp. 153, 272.*
"Microsoft Computer Dictionary" 2002, Microsoft Press, Fifth Edition, p. 499.*

(Continued)

*Primary Examiner* — Qing Wu
(74) *Attorney, Agent, or Firm* — Jackson Walker L.L.P.; Christopher J. Rourk

(57) ABSTRACT

An operating system is provided wherein a plurality of objects are established and registered in response to requests from hardware or software associated with the computer system. The objects include at least one type, at least one attribute, and a handle. The plurality of objects are then manipulated to effect processing and exchange of information.

30 Claims, 11 Drawing Sheets

OTHER PUBLICATIONS

Jim Kowalkowski: "HiDEOS" 'Online! Apr. 1996 (1996-04-111, pp. 1-25, XPDO2318979, Retrieved from the Internet: URL: http://www.aps.anl.gov/ asd/controls/hideos/> retrieved on Feb. 22, 2005! p. 1, line 1-line 22; p. 3 , line 26—p. 4, line 36; p. 5, line 10—p. 9, line 22; p. 15, line 1—p. 18, line 12; p. 19, line 33—p. 21, line 27; p. 23. line 9—p. 24. line 6.—& Jim Kowalkowski: "Highly Decoupled Operating System—HiDEOS" 'Online! Dec. 4, 1995, pp. 3-14, Retrieved from the Internet: URL: http://www.aps. anl.gov/asd/controls/hideos/hideos.html> ' retrieved on Feb. 22, 2005! & Jim Kowalkowski: "HiDEOS Reference Manual" 'Online! Dec. 4, 1995, pp. 15-25, Retrieved from the Internet: URL: http://www.aps. anl.gov/asd/controls/hideos/refman.html > 'retrieved on Feb. 22, 2005!
Maranzana, M. et al.: "Application objects and modularity in real time graphical modeling" Real-Time Systems, 1994. Proceedings, Sixth Euromicro Workshop on Vaesteraas, Sweden Jun. 15-17, 1994, Los Alamitos, CA, USA, IEEE Comput. Soc, Jun. 15, 1994, pp. 10-15, XP010099948 ISBN: 0-8186-6340-5, p. 10, left-hand column, line 29-line 35.

"C++ classes—inheritance" 'Online! Jun. 20, 1996, pp. 1-1 XP002319334 Retrieved from the Internet: URL: https://www.mcs.drexel.edu/irweaver/COURSES/MCS350/TOPICS/inherit.html> 'retrieved on Feb. 25, 2005!—the whole document.

Bocking S et al. "CHANNELS: a run-time system for multimedia protocols" Computer Communications and Networks, 1995. Proceedings, Fourth International Conference on Las Vegas, NV, USA Sep. 20-23, 1995, Los Alamitos, CA, USA, IEEE Comput. Soc, US, Sep. 20, 1995, pp. 178-185, XP010200321 ISBN: 0-8186-7180-7 abstract p. 180, left-hand column, line 2—p. 182, left-hand column, line 24 p. 182, right-hand column, line 26—p. 184, left-hand column, line 51 178-185, XP010200321 ISBN: 0-8186-7180-7.

* cited by examiner

SYSTEMS AND METHODS FOR MANAGING SHARED RESOURCES IN A COMPUTER SYSTEM

CROSS-REFERENCE TO RELATED APPLICATIONS

The present application claims priority to co-pending U.S. Provisional Patent Application No. 60/403,660, filed Aug. 16, 2002, the entirety of which is incorporated by reference herein.

BACKGROUND OF THE INVENTION

The present invention relates generally to the field of computer systems and, more particularly, to systems for scheduling process execution to provide optimal performance of the computer system.

The operation of modern computer systems is typically governed by an operating system (OS) software program which essentially acts as an interface between the system resources and hardware and the various applications which make requirements of these resources. Easily recognizable examples of such programs include Microsoft Windows™, UNIX, DOS, VxWorks, and Linux, although numerous additional operating systems have been developed for meeting the specific demands and requirements of various products and devices. In general, operating systems perform the basic tasks which enable software applications to utilize hardware or software resources, such as managing I/O devices, keeping track of files and directories in system memory, and managing the resources which must be shared between the various applications running on the system. Operating systems also generally attempt to ensure that different applications running at the same time do not interfere with each other and that the system is secure from unauthorized use.

Depending upon the requirements of the system in which they are installed, operating systems can take several forms. For example, a multi-user operating system allows two or more users to run programs at the same time. A multiprocessing operating systems supports running a single application across multiple hardware processors (CPUs). A multitasking operating system enables more than one application to run concurrently on the operating system without interference. A multithreading operating system enables different parts of a single application to run concurrently. Real time operating systems (RTOS) execute tasks in a predictable, deterministic period of time. Most modern operating systems attempt to fulfill several of these roles simultaneously, with varying degrees of success.

Unfortunately, the ability of known operating systems to efficiently handle resource allocation and application/hardware performance on embedded systems remains deficient to the requirements of modern systems, particularly embedded systems. Accordingly, there is a need in the art of computer systems for an operating system which enables such efficient and accurate handling of requirements in an embedded system. Further, there is a need for an operating system which can work together with conventional operating systems, thereby enabling conventional systems to work with hardware/software for which it was not specifically designed.

SUMMARY OF THE INVENTION

This present invention overcomes the above-described limitations and deficiencies by providing a operating system environment including the following elements: 1.) system service abstraction API (application programming interface); 2.) legacy service API to support existing OS code; 3.) native (i.e., new) OS implementation; 4.) hosted 3rd party OS implementation; 5.) structural abstraction to allow broad application together with excellent performance (interfaces); 6.) a simplified object-oriented system design and properties to provide consistent end user API and minimized implementation work for new hosted $3^{rd}$ party platforms; 7.) unique interrupt handling architecture; 8.) architectural support for hardware acceleration; and 9.) support for multiprocessor/multi-ASIC designs.

In one embodiment of the present invention, a method for managing shared resources in a computer system is provided comprising establishing and registering a plurality of objects in response to requests from hardware or software associated with the computer system. The objects include at least one type, at least one attribute, and a handle. The plurality of objects are then manipulated to effect processing and exchange of information.

BRIEF DESCRIPTION OF THE DRAWINGS

The present invention can be understood more completely by reading the following Detailed Description of the Preferred Embodiments, in conjunction with the accompanying drawings.

DETAILED DESCRIPTION OF THE PREFERRED EMBODIMENTS

The inventive operating system (hereinafter referred to as the Quantum™ operating system or simply, Quantum™) provides a new execution environment for applications and driver software. It targets the embedded software space, where issues such as performance, real-time response, software reliability, and hardware flexibility are dominant. Quantum™ aims to provide all client embedded applications with the following:

1. Pre-emptive multitasking with sophisticated application quality of service (QoS);
2. Support for protected and virtual memory on platforms with a hardware MMU;
3. Support for multi-processor hardware configurations;
4. Inherent application portability to third party OS platforms;
5. Inherent application portability to new hardware architecture;
6. Increased performance over comparable OS platforms such as ATMOS™ from GlobespanVirata Incorporated;
7. A single, simple programming model for all software; and
8. Support for all existing ATMOS™ applications.

More particularly, the Quantum™ operating system aims to provide these features by means of a new OS Kernel, hereinafter referred to as ATMOS2. The APIs have also been concurrently specified to map to other OS platforms, allowing easy support of Quantum™ compliant applications and drivers on other third party OS software regimes.

Figure 1:
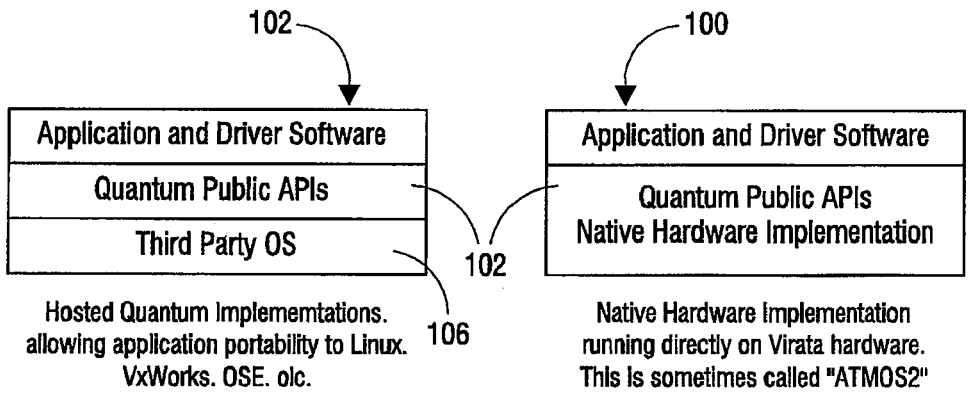
FIG. 1 is a generalized block diagram illustrating two configurations for the operating system of the present invention.

Referring now to FIG. 1, there is shown a generalized block diagram illustrating two potential Quantum™ configurations: a native configuration 100 and a hosted configuration 102. The various public APIs 104 (application program interfaces) for Quantum™ have been carefully designed to allow extremely efficient implementations on target hardware platforms, while also providing a relatively simple mapping to a typical third party OS platform 106. The underlying design is also intended to take advantage of hardware accelerators to improve message passing and general task scheduling behavior. On dual-processor class ASICs (application-specific integrated circuits), such as the Helium™ series devices from GlobespanVirata Incorporated of Redbank, N.J., this acceleration can be provided for the first or protocol processor (PP) by means of a software assist running in parallel on the second or network processor (NP). On future ASICs, additional hardware support may be added to improve the efficiency and performance of the task scheduling system. For this reason, the "native" implementation is usually not shown as a distinct entity from Quantum™ itself, since functions may be implemented by hardware directly or by a few inline assembler instructions.

A public API in Quantum™ is any programmatic interface that may used by software, either application or driver-specific code, outside of Quantum™ itself. There are currently two public API sets: Quantum™ AS (application services) and Quantum BS (board support). The Quantum™ AS software layer is the main application service API set. It comprises a number of loosely connected function libraries that may be called from C or C++ application code. In one embodiment, the following functionality is provided:

1. Platform abstraction (word size and endian support);
2. Memory management;
3. Task support;
4. Inter-task messaging and network data buffering;
5. Inter-task synchronization via semaphores and mutexes;
6. Hardware interrupt service support; and
7. General utilities (block memory handling, strings, etc)

Additionally, alternative or enhanced embodiments may also incorporate the following functionality:

1. Logging and console support APIs;
2. High performance driver support (Quantum™ Warp Engine);
3. Generic attribute and application management; and
4. Multi-processing implementations Quantum™ BS: Board Support The Quantum™ BS software layer is the board support API. Unlike the AS API's, this defines functions that are used to implement board specific support code. Such functions are currently limited to defining interrupt logical routing and providing interrupt stub handlers for platforms where these are not directly provided by the Quantum™ software itself. The BS API currently defines only one function type:

bs_PackageInitialise( )

This function is normally provided by the board designer. For example, ASIC (application specific integrated circuit) specific support packages are implemented internally within Quantum™ and are "hidden" from an actual user of a Quantum™ release. The initialization function is called at start of day after Quantum™'s internal system initialization is complete but before any application tasks or drivers have been started. Its sole purpose is to define the interrupt mappings that will be used on the board (e.g., mapping the 'dying-gasp' interrupt from a physical chip to a specific GPIO (general purpose Input/Output) interrupt line with a specific level sense condition).

Quantum™ Internal APIs

The public API set provided by Quantum™ is backed by a number of internal APIs with a variety of implementations that may depend on the target hardware or on the underlying third party OS (if any). The following internal API sets currently exist:

1. Quantum™ XS—Platform neutral functions
2. Quantum™ HS—Host Support functions
3. Quantum™ CS—Compiler Support functions
4. Quantum™ LS—Legacy Support functions This partitioning is not always absolute. The diverse range of supported platforms often mean that functions intended for one module area "leak" into another (e.g., CPU specific speed up code in Quantum™ XS, or compiler or tool support code in Quantum™ HS). Accordingly, such a shared or leaked structure is envisioned and supported by the system of the present invention. However, where possible the software tries to use the indicated structural organization to maximize code reuse between platforms.

Figure 2:
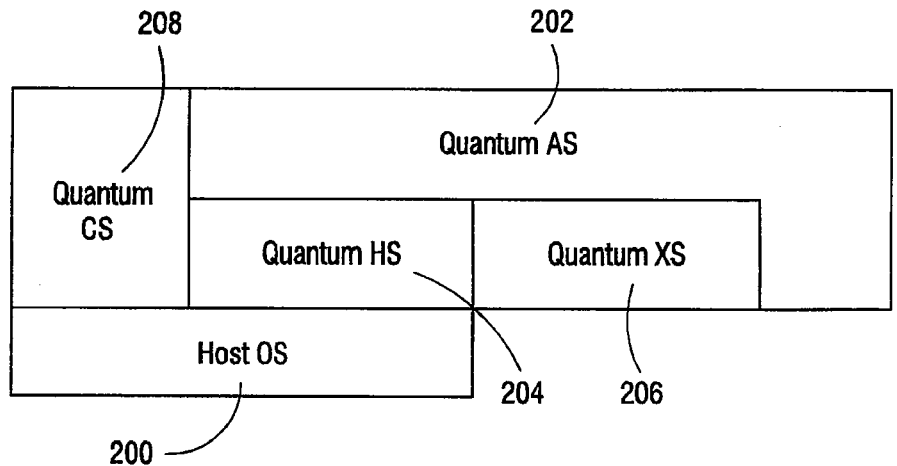
FIG. 2 is a block diagram illustrating one embodiment of an internal structure for a hosted operating system.

The legacy support module (LS) implements functions historically provided by the ATMOS Kernel. Its purpose is to allow original ATMOS application code to continue running. LS is not supported on hosted OS targets, since the APIs provided by the original ATMOS design are extremely difficult to implement effectively under some key target OS's. Referring now to FIG. 2, there is shown a block diagram illustrating one embodiment of an internal structure for a hosted Quantum™ target, including the relative structure of the Host Operating System (OS) 200, the Quantum AS 202, the Quantum HS and XS layers 204 and 206, and the Quantum CS layer 208.

Figure 3:
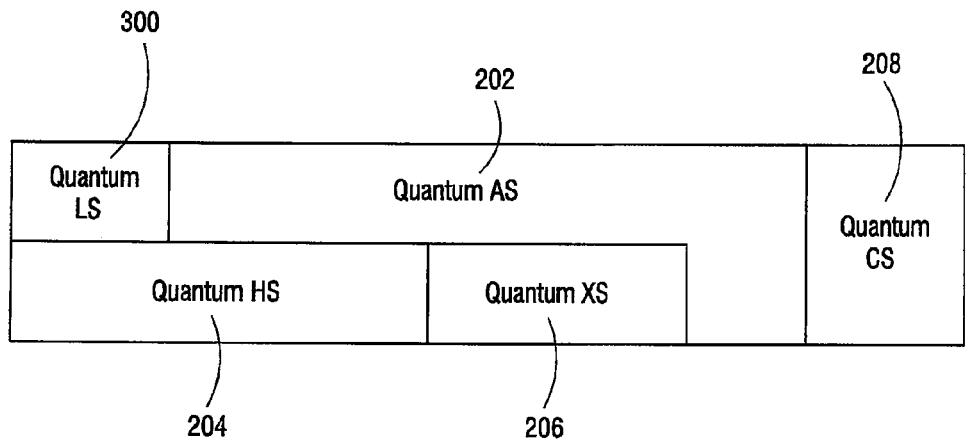
FIG. 3 is a block diagram illustrating one embodiment of an internal structure for a native operating system.

Referring now to FIG. 3, there is illustrated a diagram corresponding to a native target implementation (i.e., no Host OS) where the HS layer is directly implemented on the target hardware. A legacy support layer, Quantum LS (300) is further provided in this embodiment. By layering the LS structure 300 directly on top of the HS module 204, the original ATMOS functions can be implemented extremely efficiently. In fact, the performance of the LS implementations of ATMOS's original messaging APIs is significantly better than that of the original ATMOS Kernel (in some cases, as much as 5 to 10 times faster).

Quantum™ XS

Quantum™ XS is intended to be a generic portable software layer that simplifies the implementation of the platform specific portions of Quantum™. Its major functions include:

1. Debug—generic and extensible system debug framework;
2. UART—low level UART access functions for use in system startup;
3. Object—the system object manager; and
4. Startup—the system startup manager.

The debug functions implement low level diagnostic code for use in non-release builds. These include assert( ) like traps and a simple console based debug task with an extensible command parser. The debug console is entered by explicit request from within the Quantum™ software, and is typically used to allow diagnosis of fatal exceptions such as unexpected memory aborts. This is a low level tool that allows inspection and modification of system objects and memory, however, it is not a symbolic source debugger.

The UART functions provide a low-level access to a console UART (universal asynchronous receiver transmitter), together with simple Kernel printf( ) functionality. This may be used by engineers working on Quantum™ to help diagnose internal problems in Quantum™ itself. It should be noted that kernel level UART and printf ( ) handling are not available to application code. Rather, these functions (and all other internal functions) may only be used from within the operating system itself.

The object support library provides a generalized management tool for arbitrary objects that may need to be implemented by a host specific platform, such as memory, sempahores, tasks, etc. The object API's implement a filing system like hierarchical database that tracks usage of objects and which provides a generic mechanism to provide access to object properties by means of an attribute mechanism. The object system is a superset of that originally provided by the BUN (broadband unified network) driver framework, and provides support for inheritance and aggregation of types. Unlike BUN, the system is dynamic, permitting objects to be created and destroyed. The system also provides for arbitrary run-time extension of the data types and run-time type safety for clients of the object system. The startup function is a simple module that handles initialization of Quantum™, ensuring that the various library modules are initialized in the correct sequence, and starting any statically defined application tasks.

Quantum™ HS

Quantum™ HS implements the host specific portion of the software, either by mapping API calls to a third party OS or by directly interacting with the CPU or other system hardware for native implementations. Facilities provided by the HS layer include tasks (the execution unit in Quantum™), messaging, semaphores, mutexes and memory management. The HS layer may also override some functions in other portable software layers in order to provide specific performance gains (e.g.; for memcpy( )). HS software typically makes extensive use of the XS object library to implement basic functions such as opening, closing, creating and deleting system objects such as tasks or semaphores.

Quantum™ CS

Quantum™ CS provides compiler support functions. C or C++ compiler tools often require a small support library to implement "internal" functions such as copying of data structures (for assignment), basic math operations (such as integer division on CPUs with no divide machine instruction) or C++ features (such as the new and delete operators, RTTI, exception handling, etc). Currently, Quantum™ simply uses the compiler support code from ATMOS. This is specifically targeted at the GNU tool chain.

Quantum™ LS

Quantum™ LS implements legacy APIs necessary to maintain existing ATMOS software. LS is only supported on native platforms.

Quantum™ Application Architecture

The Quantum™ system service APIs define the basic structure of an application, setting down the way application code interacts with hardware and software in a complete system. The basic unit of execution in Quantum™ is the task. Quantum™ makes no distinction between the traditional concepts of a "process" and a "thread" and instead uses a single object type to implement both facilities. This reduces the number of APIs needed, reduces the porting effort to new platforms, and allowing focused optimization of the task handling code for best performance. A task typically executes a message loop, receiving requests from other tasks or hardware and performing some processing in response. The following code structure represents one embodiment of a messaging scenario.

```
tASErr main(int argc, const char* argv[ ])
{
    // Indefinite loop to process messages.
    for (;;)
    {
        // Wait for a message to be sent here
        tASMessage msg = as_MessageWaitPrimary( );
        // Decode the message and handle it
        switch (as_MessageCode (msg) )
        {
            case abc:
            ...
            case xyz:
            ...
        }
    }
    // Break out of the loop to exit.
    return kASEOK;
}
```

Object Naming Conventions: The System Name Space

Quantum™ employs a back-end object database that implements access to all system objects—tasks, shared, memory, semaphores, etc. Most Quantum™ APIs there tend to have a similar look and feel. The API set for most system objects is of form:

new—create a new instance of an object;

delete—remove an existing instance of an object;

open—obtain a handle to an existing object;
close—desist from using a given object; and
Object specific API calls All objects are specified by name within a global name space. Object names are structured to look not unlike a traditional UNIX file system tree and will be discussed in additional detail below. The following top-level structure is used:

| /task | tasks and objects created by tasks |
| /memory | global shared memory |
| /pool | global message pools |
| /interface | global interfaces |
| /interrupt | hardware interrupt sources |

Objects may possess many different forms. For example, a message pool provides a specific pool handle as well as an interface that can be used to provide message functions. Hence the following API calls:

tASPool pool;
tASInterface interface;
as_PoolOpen(&pool, "/pool/generic");
as_InterfaceOpen(&interface, "/pool/generic");

both refer to the same object—the generic message pool. However, the two calls return different representations of the same object—the first a pool handle which can be used to perform pool specific operations, the second an interface that can be used to allocate or release messages. This genericity means that many of the APIs you might normally expect to find in an system service software layer appear not to be present in Quantum™. Message pools, inter-task message exchange and interrupt handling are all performed using the interface object type exported by many of the system objects.

Objects may be accessed by both a type specific API and a generic attribute mechanism. Attributes are typically used when creating a new object of a specified type. The following example code will create a new globally accessible pool object:

tASPool pool;
as_PoolNew(&pool, "/pool/magic", "size=1024/count=32/prefix=64");

The pool object will accept attributes both specific to the pool itself, but also for any other representations that it might possess. Hence a pool object also provides all of the attributes of an interface object. Objects may also be created using a relative path name.

Tasks, Messages and Interfaces

A task is a single thread of execution, with all tasks being scheduled independently by the operating system. Further, in order to protect such execution threads, tasks may utilize protected memory within the computing system. A message is a block of information that can be passed to other tasks by means of an interface. Messages can carry network datagrams, control information, or requests to perform some action. Message content is defined by the application code, not Quantum™. The basic functions common to all interfaces are:

1. put—send a message to an interface;
2. get—non-blocking fetch a message from an interface; and
3. wait—blocking wait for a message to arrive at an interface.

All interfaces support these basic operations. The AS APIs provide syntactic sugar to provide additional APIs with semantics for message replies and synchronous send-wait calls. However, all such operations are based on these three primitive functions.

Interfaces may also represent other tasks in the system, such as "pools" of free messages that can be allocated, or "interrupt" objects that implement traditional interrupt processing under Quantum™. While all interfaces respond to the same API semantics, the manner in which they are used by applications is a matter of convention, largely driven by the naming of the interface.

Figure 4:
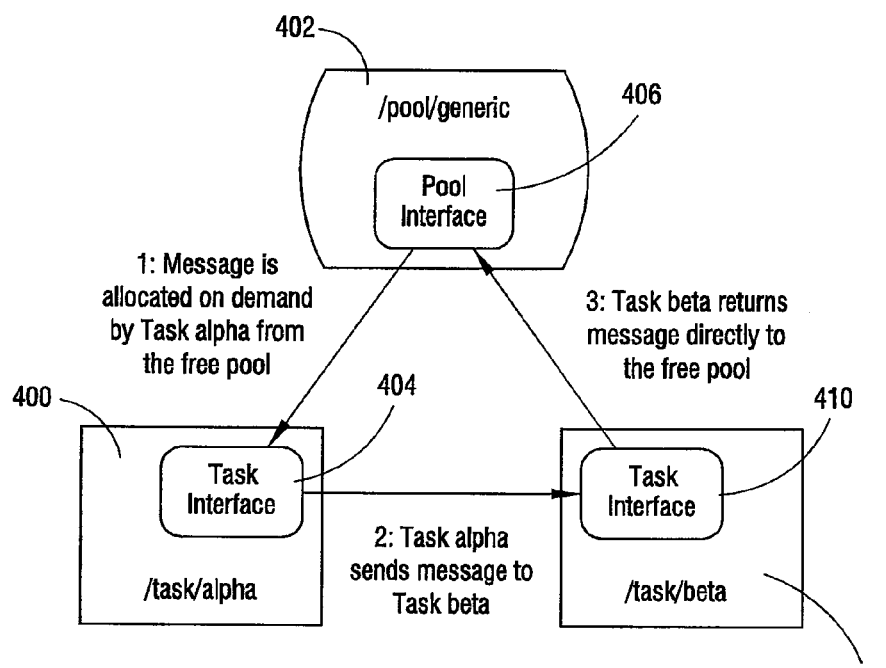
FIG. 4 is a flow diagram illustrating one example of a uni-directional message exchange in accordance with the present invention.

Referring to FIG. 4, there is shown an example of a uni-directional message exchange between two tasks under Quantum™. Initially, task alpha 400 requests a message from the free pool of messages 402 through their associated interfaces 404 and 406, respectfully. Task alpha 400 then sends the message to task beta 408 through its interface 410. Task beta then returns the message to the free pool 402. As shown, no distinction is visible to the tasks between the three interfaces, other than their objects names and the way that they are used. The basic operations used to exchange the messages are independent of the type of interface that the message is being exchanged with.

Figure 5:
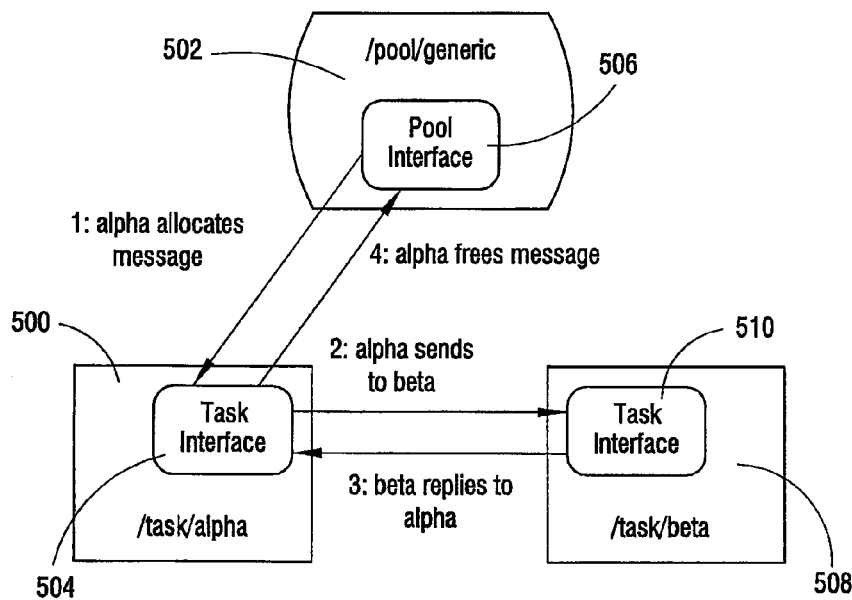
FIG. 5 is a flow diagram illustrating one example of a send-reply messaging exchange in accordance with the present invention.

Referring now to FIG. 5, there is illustrated a flow diagram showing a more complete send-reply messaging sequence. Initially, task alpha 500 requests a message from the free pool of messages 502 through their associated interfaces 504 and 506, respectfully. Task alpha 500 then sends the message to task beta 508 through its interface 510. Task beta 508 replies to task alpha using the message. Task alpha 500 then returns the message to the free pool 502.

Quantum™'s message model brings a simplification of the programming APIs, performance gains and more efficient support for protected or virtual memory. All Quantum™ messages must be allocated from a dedicated message pool; messages cannot be simply created as a structure on the local application stack. These messages contain a type code that defines the purpose of the message and its content. Type codes are assigned by the applications, not by Quantum™. Messages may be uni-directional, or use a send-reply sequence as described above. Uni-directional messaging is inherently more efficient, but may only be used where no explicit acknowledgement of the message is required by the originator.

Memory Space Issues

In accordance with the present invention, Quantum™ supports protected and virtual memory configurations. This places constraints on the access that may be made to memory between tasks. In particular, each top-level task is provided with its own private memory resource. Any sub-tasks created inherit access to the parent's memory space, as well as any handles owned by the parent for system objects, such as semaphores or mutexes.

Figure 6:
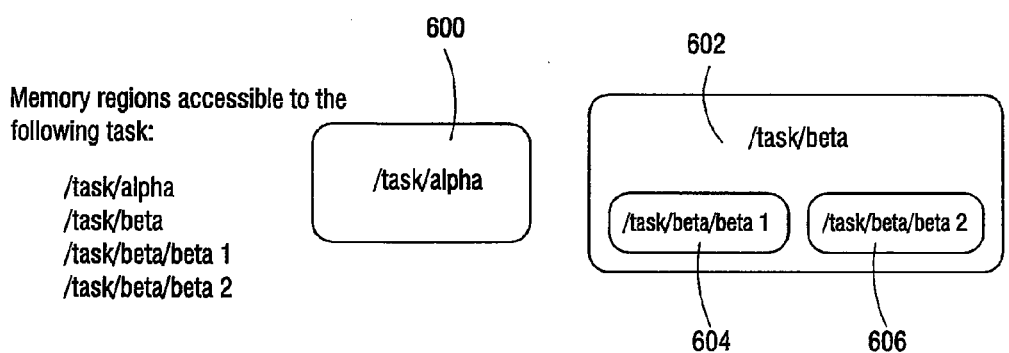
FIG. 6 is a block diagram illustrating one embodiment of a memory structure.

The diagram of FIG. 6 illustrates one example memory structure of the present invention. More particularly, it can be seen that the memory is accessible to a typical set of tasks running under Quantum™: Memory allocated by any task is accessible by it and any subtasks that it may choose to create—but not from other tasks in the system. Therefore, in the example of FIG. 6, alpha's memory 600 is entirely private to alpha, memory 602 allocated by beta can be seen by beta and any subtasks, and memory 604 or 606 allocated by beta1 or beta 2 is local to the subtask and can not be directly accessed by either alpha nor beta directly. The general rule is that allocated memory is only accessible to that task and any subtasks that have been created, not vice-versa.

Explicit blocks of shared memory can also be created and exported using the AS memory APIs. Shared memory regions are identified by name under the "/memory" area of system file space. The AS API's contain functions to map such regions to an address that may be directly addressed by a task.

As with locally allocated memory, any shared memory that is accessible by a task is also accessible by its subtasks.

Interrupts

As stated above, Quantum™ does not permit the use of "traditional" interrupt handlers, as used by systems such as ATMOS (other than in the LS emulation layer). In fact, there are no application APIs that would appear to provide any support at all for hardware interrupts. Rather, interrupt service requests are handled using the above-described messaging system, coupled with specialized "interrupt" message interfaces. In this manner, sending a message to an interrupt interface enables the interrupt source. When the interrupt fires, the interrupt is disabled and the message returned to the originator as a reply.

Figure 7:
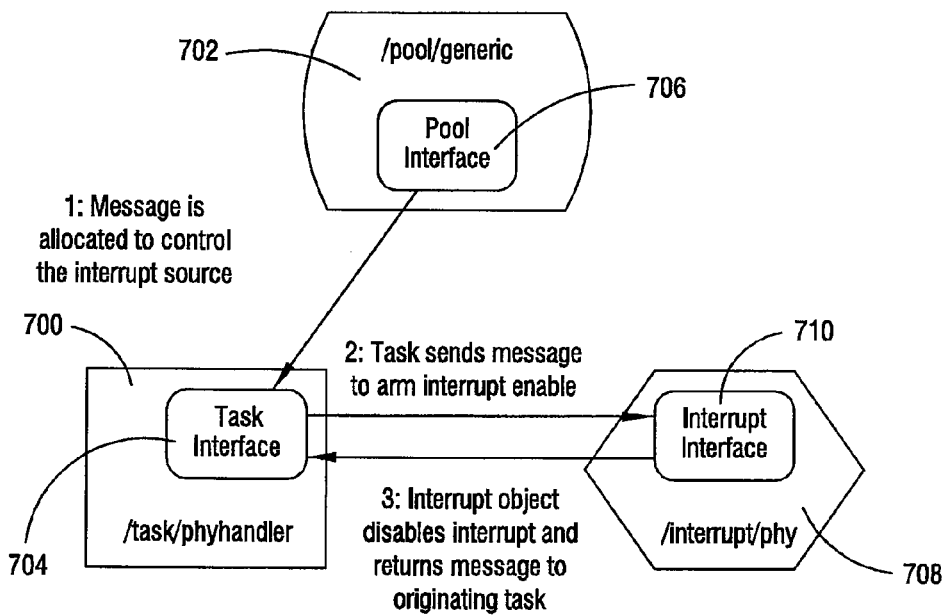
FIG. 7 is a flow diagram illustrating one example of an interrupt handler message exchange in accordance with the present invention.

Referring now to FIG. 7, there is shown a flow diagram illustrating one embodiment of an interrupt handler task's interaction with an interrupt object. Initially, task phyhandler 700 requests a message from the free pool of messages 702 through their associated interfaces 704 and 706, respectively. Task phyhandler 700 then sends the message to arm an interrupt enable at an interrupt object phy 708 through the interrupt's interface 710. The interrupt object phy 708 then disables the interrupt and replies to task phyhandler 700 using the message.

Interrupt objects are very simple. They know nothing about the format or content of the messages exchanged with them. The simple presence or absence of a message is sufficient to handle the interrupt enable and disable, and also to signal when an interrupt has triggered. The following code example illustrates the implementation of an interrupt handler task:

```
tASErr main(int argc, const char* argv [ ])
{
    tASInterface interrupt;
    tASInterface pool;
    tASMessage msg;
    tASErr err;
    // Find our interrupt source's interface.
    err = as_InterfaceOpen(&interrupt, "/interrupt/phy");
    if (kASEOK != err) return err;
    // Find a pool and allocate a message from it.
    err = as_InterfaceOpen(&pool, "/pool/generic");
    if (kASEOK != err) return err;
    msg = as_InterfaceWait(pool);
    for (;;)
    {
        // Enable the interrupt source and wait for it to
        // fire. This simple example assumes that the only
        // message delivered to this task is the interrupt
        // message itself.
        as_MessageSendWait(interrupt, msg);
        // Handle the interrupt here, accessing the hardware as
        // needed. When done, we just loop back around to re-enable
        // the interrupt source and wait for the next request.
    }
}
```

With careful choice of the message code used for a given interrupt source, a single task could handle multiple interrupt sources as well as processing messages received from other tasks.

Interrupt objects appear by convention in the global file space under "/interrupt/". Interrupt source names are logical names assigned by the system integrator in the Board Support package. For example, the board support (BS) API may be used to create an interrupt named "/interrupt/phy" that is mapped to a specific GPIO line with specific level sensitivity characteristics.

The Quantum™ Object Database

Quantum™ provides a global system object database, with facilities to support safe dynamic run-time typing and the construction of new object types at run time using the basic principles of single inheritance and aggregation. The database is currently used as the back-end to all Quantum™ system objects, such as tasks or semaphores. As such, it also supports facilities for tracking the users of objects, greatly simplifying the problems associated with dynamic object creation and deletion in an embedded real-time system.

A Quantum™ object is an arbitrary block of data characterized by the following:
1. A 'C' based API that uses an object specific 'handle' as an argument;
2. A generic attribute based access system for non-performance critical configuration and status information;
3. A potential need to be shared between many tasks; and
4. A potential need to be derived from other objects.

Figure 8:
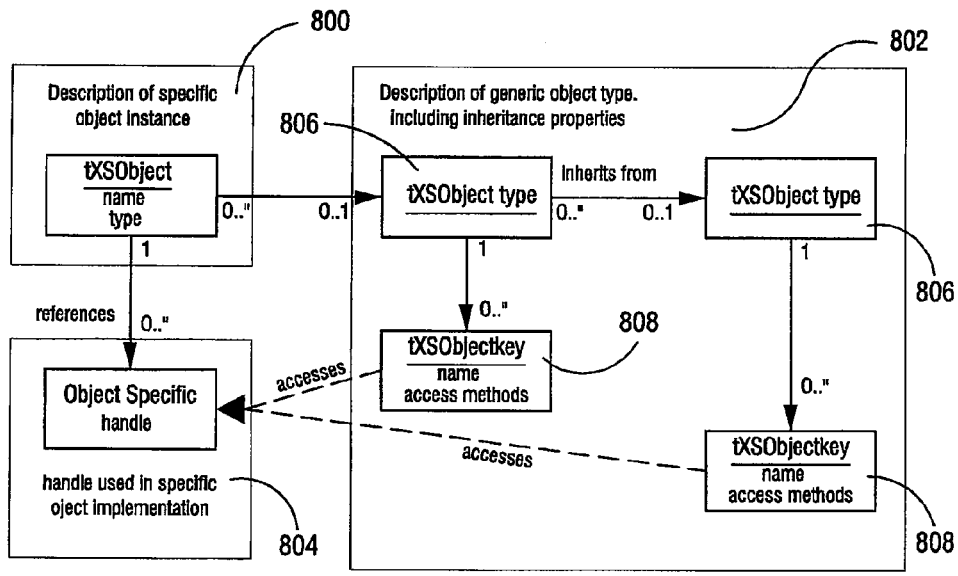
FIG. 8 is a block diagram illustrating one embodiment of relationships between object structures.

Referring now to FIG. 8, there is shown a block diagram illustrating the relationships between the various structures used to construct an object using inheritance. As shown, an object is made up of several general structures, including descriptions of specific object instances 800, inheritance properties 802, and a handle 804. The inheritance properties include any derived objects 806 and their attributes 808. The object handle 804 is typically a simple integer or pointer value that normally references a data structure that is used to implement the specific object. This object handle 804 is returned to an application in response to a request to create or open an instance of the object type, and is also passed to the code that implements the specific object type in response to requests to query or set attribute values.

Figure 9:
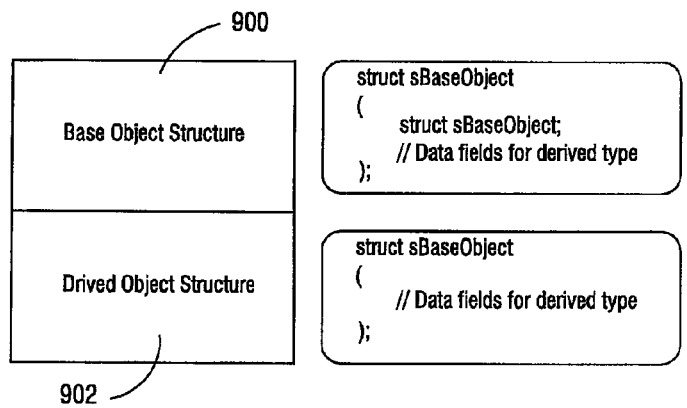
FIG. 9 is a block diagram illustrating one embodiment of object structure implementation.

As shown in FIG. 8, derived objects 806 use the same handle 804 as their parent classes 800. This means that all APIs for the parent class 800 may also be used with a subclassed object 806. There is no mechanism for a subclass to override methods provided by the parent class (object "methods" are in this case simply C function calls). To support this, object implementation must be able to cast (in the C type sense) between the base and derived object handles. This means that a derived type's data should always be appended to the data for the parent type. Referring now to FIG. 9, there is shown a block diagram illustrating one example of a possible object implementation under Quantum™. More particularly, a base object structure 900 is provided with any derived object structures 902 appended thereto.

Figure 10:
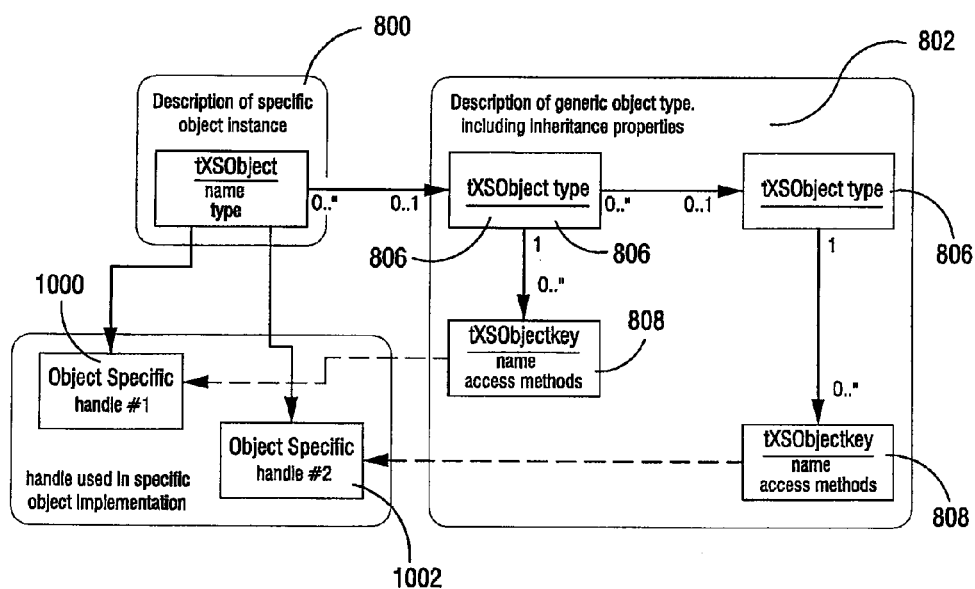
FIG. 10 is a block diagram illustrating another embodiment of relationships between object structures.

Unfortunately, imposing such a scheme on all objects can introduce unnecessary overhead to the function call APIs, typically due to a need to construct container objects where simple single inheritance is not practical. As a result, Quantum™ also supports an aggregation form of inheritance. FIG. 10 illustrates one example of an aggregate manner of object implementation. Unlike the single inheritance model of FIG. 8, specific object implementations are each provided with discrete handles 1000 and 1002.

To an application, both implementations function the same since the code must issue type-specific API calls to obtain the object handles. That is, a single object of type task that inherits from type interface always appears as a single object when accessed via the attribute access mechanisms, but always appears as two objects of different type when accessing the handle for use with performance critical object-specific API calls. Such a scheme differs from most traditional inheritance mechanisms, where a single handle would respond to API calls (methods) of two or more types. By not supporting this, Quantum™'s object model can retain maximum performance (no virtual function-call overheads) while still benefiting from the structural and code-reuse benefits that occasionally arise from an object oriented design.

The type system used by Quantum™ is entirely generated at run-time. Accordingly, any code that implements a particular type of object must register the type with Quantum™ at run time. This registration process allows Quantum™ to ensure that all types are unique, inheritance information for the type, and specific attribute keys. In one embodiment, objects are typed using the AS TYPE( ) macros exported from as types.h. These use a four-character code to generate a 32 bit numeric type identifier. Conventions are used to avoid conflicts in type codes arising, and in any event, any conflict will be trapped at run time when the type is first registered—giving the implementors of an object a chance to correct the error.

The following examples illustrate object creating in Quantum™:

Creating a new semaphore:
    #include "quantum/as.h"
    tASSemaphore sem;
    tASErr err;
    err=as_SemaphoreNew(&sem, "lock", "count=10");
where "err" refers to the error status code; "&sem" refers to the returned handle; "lock" refers to the object name; and "count=10" refers to the object's properties.

Opening a message free-pool's message interface:
    #include "quantum/as.h"
    tASInterface pool;
    tASErr err;
    err=as_InterfaceOpen(&pool, "/pool/generic"
where "err" refers to the error status code; "&pool" refers to the returned object handle; and "/pool/generic" refers to the object's name.

Object Attributes

Figure 11:
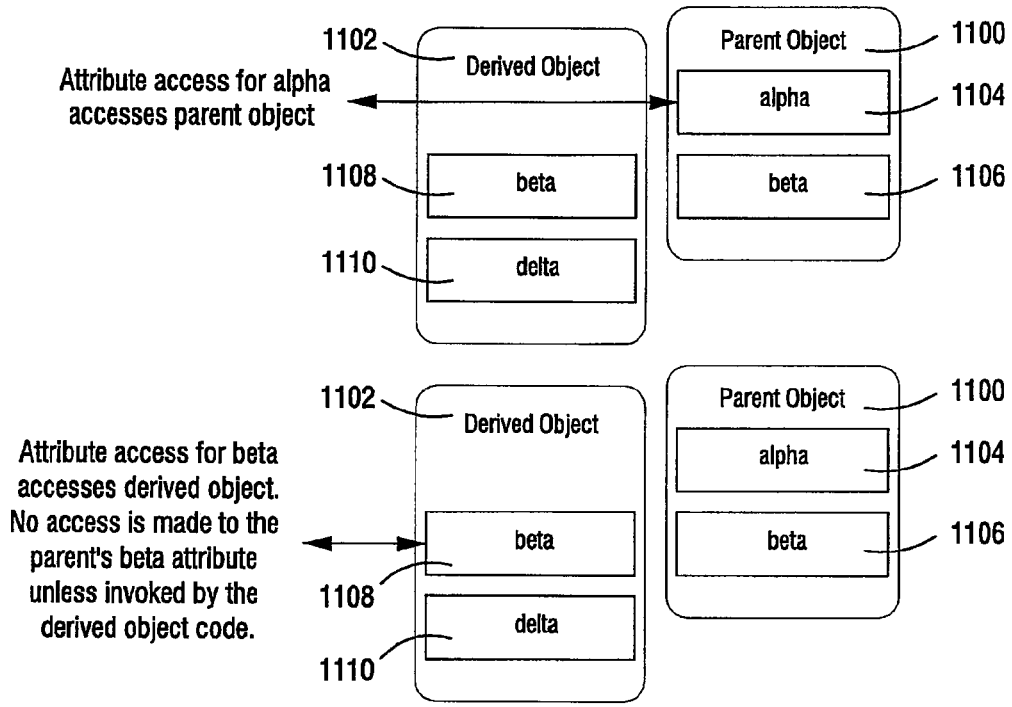
FIG. 11 is a block flow diagram illustrating derived and parent object attribute access structure in accordance with the present invention.

Quantum™ objects use a attribute mechanism to provide access to non-performance critical properties or status information. In this mechanism, derived types extend the attributes of the parent type. The extended attribute set can override attributes of the parent so that attribute "set" and "get" operations only access those of the derived object and not the parent. Referring now to FIG. 11, there is shown a block diagram illustrating one embodiment of a object/attribute structure of the present invention. In the embodiment of FIG. 11, attribute access for each of a parent object 1100 and a derived object 1102 are shown. The parent object 1100 includes alpha and beta attributes 1104 and 1106, respectively, while the derived object 1102 includes beta and delta attributes 1108 and 1110, respectively. In view of the present mechanism, an initial attribute access for alpha access the alpha attribute 1104 of the parent object 1100. However, in a subsequent beta access, only the beta attribute 1108 of the derived object 1102 is accessed. No access is made of the parent's beta attribute 1106 unless such an access is invoked by the derived object's code.

Attribute keys and accessor methods are defined once and used for all objects of a specific type. In contrast, there may be many specific instances of an object, each with its own data that may be accessed through the common attribute access information. The following code sequence illustrates the creation of a base object class with two derived types:

```
// Structure definitions for a base class containing a single
// integer variable and a derived class containing a single
// string variable.
typedef struct
{
    int base_value;
} tBaseType;
typedef struct
{
    struct sBaseClass base;
    char derived_value[32];
} tDerivedType;
```

The following attribute access is provided by the base class:

```
tASErr base_setValue(tBaseType* pObject, int* pValue)
{
    pObject->base_value = *pValue;
    return kASEOK;
}
tXSObjectKey baseKeys [ ] =
{
    XS_OBJECT_KEY_INTEGER("base-integer", 0, base_setValue),
    XS_OBJECT_KEY_END
};
```

The base class will register its object type using a call of the following form:

```
#define kBaseType AS_TYPE('b', 'a', 's', 'e');
err = xs_ObjectTypeRegisterBase(
    kBaseType,       // Type being registered
    "tBaseType",     // The C typedef name (or equivalent)
    100,             // Version number
    baseKeys);       // List of keys
```

The derived type will use the following attribute definition:

```
tXSObjectKey derivedKeys[ ] =
{
    XS_OBJECT_KEY_INTEGER("derived-integer", 0,
    derived_setValue),
    XS_OBJECT_KEY_END
};
tASErr derived_setValue(struct sDerivedClass* pObject, const char*
pszValue)
{
    return as_StrCopy(pObject->derived_value, pszValue, sizeof pObject->
    derived_value);
}
``` and the following to register its object type as type derived from kBaseType:

```
#define kDerivedType AS_TYPE('d', 'e', 'r', 'v');
err = xs_ObjectTypeRegisterDerived(
    kDerivedType,    // Type being registered
    "tDerivedType",  // The C typedef name (or equivalent)
    100,             // Version number
    derivedKeys,     // List of keys
    kBaseType);      // Type that this one derives from
```

Quantum™ then automatically links the attribute systems together and sorts out all the business of dealing with the object. When creating an object:

```
tXSObject object;           // System software object handle
struct sDerivedType data;   // Type specific data
err = xs_ObjectNew(
    &object,                // Returns system object handle
    pszName,                // Name for object
    pszDefaults,            // Default properties to be applied
    &data,                  // Object specific handle
    kDerivedType,           // Object type code
    hs_TaskCurrent( ));     // Task requesting the operation
```

An alternative form of the xs ObjectNew( ) function is used when creating objects using aggregation, differing only in that an array of object handles must be supplied.

The Object File System

In accordance with one embodiment of the present invention, objects are organized by a global file system. This appears to clients of the object database much like a traditional UNIX file system. There are two main exceptions to this:

1. "files" simply contain references to objects in memory, not data itself; and

2. Any "file" may be both an object in its own right and a container for other objects.

The top-level structure of the file system is normally organized in the following manner, however, it should be understood that the following listing is not exhaustive and that additional top level structures may also be supported:

```
/task         System tasks
/pool         System global message pools
/mutex        System global mutexes
/semaphore    System global semaphores
/interface    System global interfaces
/interrupt    System global interrupt controllers
/memory       System shared memory objects
```

Figure 12:
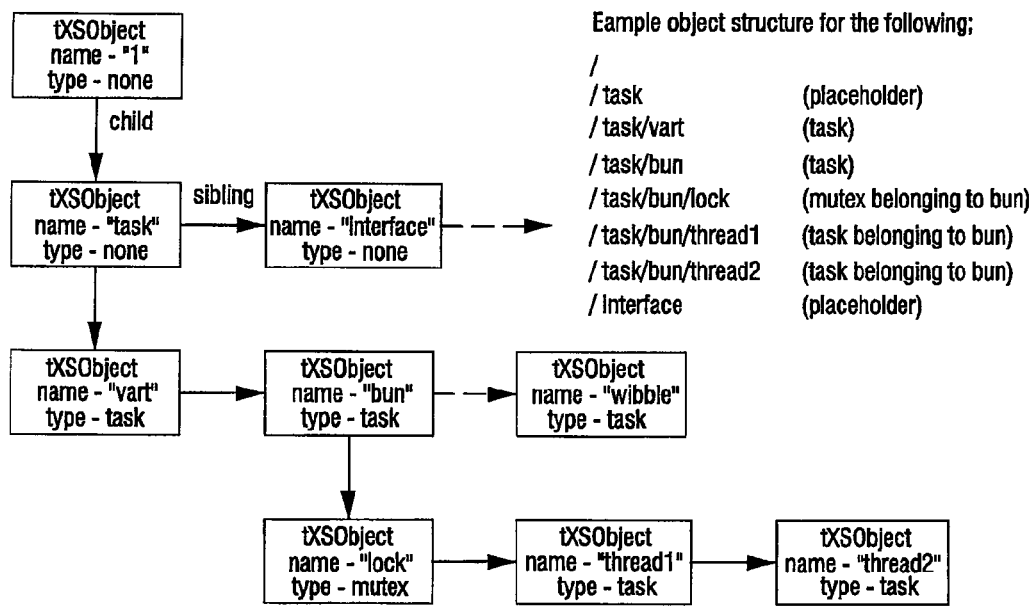
FIG. 12 is a block flow diagram illustrating one embodiment of an object structure in accordance with the present invention.

Referring now to FIG. 12, there is shown a flow diagram illustrating one example of how such a structure may be implemented in software using the tXSObject structure type (this is actually a simplification of the actual implementation, which includes additional links and data to accelerate tree traversal and searching, however such extensions are largely trivial and understood by those skilled in the relevant arts.) The object database understands the identity of any task that makes a request to open, close, create or delete and object. This allows the use of either absolute or task-relative filenames.

Task relative filenames omit the leading '/' character, and are used to access objects contained within the accessing task. The top-level tasks in the above example could have been constructed using the following API calls:

```
as_TaskNew(&uart, "/task/uart");
as_TaskNew(&bun, "/task/bun");
``` while the objects created by BUN could have been created by the following calls issued from within the BUN task:

```
as_MutexNew(&mutex, "lock");
as_TaskNew(&task1, "thread1");
as_TaskNew(&task2, "thread2");
```

Such a scheme implements a second, weaker form of aggregation for Quantum™ objects. In the example of FIG. 12, the bun task acts as a container for a mutex and two other tasks (thread1 and thread2). These objects are coupled to "/task/bun" such that any attempts to delete or remove "/task/bun" will also cleanup and remove the contained objects. However, the individual objects remain as independent entities. The bun task does not, for example, inherit any of the attributes of objects that it contains. Note that under Quantum™, any object may be used as a container and all such associations are dynamic (i.e., established or removed at run-time, not statically at compile-time).

ARM-Specific Native Implementation Information

The native ARM implementation of Quantum™ employs some specific features to improve performance on such a processor environment. This following section details the more obscure issues relating to this implementation.

Task and Interrupt Execution Environments

In accordance with an ARM-specific embodiment of the present operating system, all application tasks are executed in a non-privileged state; the ARM "user" execution mode. Execution of key OS routines are performed using ARM software interrupts, known as SWI traps. The ARM SWI instruction forces the CPU in to a privileged execution state, with IRQ and FIQ interrupts disabled. This ensures that operations are atomic and allows access to the privileged instructions necessary to perform task switching.

Hardware interrupts are executed in IRQ or FIQ state. IRQ interrupts are always trapped by the system and handled by a stub interrupt handler that replies to messages posted to an interface. By preventing driver writers from direct access to the IRQ interrupt state, Quantum™ can enforce QoS for all code running on the system, avoiding the problem of "runaway IRQ code", where eventually all code ends up running in interrupt to improve performance of each handler and resulting in essentially unbounded interrupt latency.

Both IRQ and FIQ low level handlers can use the interface functions for 'put' and 'get'—but not 'wait'. This allows the interrupt stubs to communicate with real driver code. Normally, stub IRQ handlers are provided for all the interrupt sources supported by a given ASIC as part of Quantum™'s host support package. Engineers developing device drivers are not permitted to write their own IRQ handlers at present.

SWI Traps and System Services

In accordance with the ARM-specific embodiment of the present invention, SWI instructions are used to gain access to a privileged CPU level for certain system functions, such as messaging or entering the system debugger. The conventional form of the SWI instruction in ARM assembler is:

swi <vector_number>, where vector_number is a 24 bit number that is conventionally used to encode the function request. This number must be decoded from the SWI instruction opcode, requiring significant software overhead. Quantum™ ignores the vector number, and instead uses a proprietary calling convention. It should be noted that this calling convention was specifically designed to improve the performance of message passing (see Interfaces and Messaging via SWI Traps discussed in detail below), though it is also used for other more general system operations.

Before entry to a SWI trap instruction, the following must be valid:

r0=the address of an sHFSWIDispatch structure;
r1=a function specific parameter;
r2-r14 undefined; and
The PSR can take any value (though the calling code must not be executing in SVC mode; this is a general ARM restriction on SWI traps, rather than a Quantum™ specific restriction)

and on return from the SWI trap the CPU state will conform to:

r0=return parameter from the SWI;
r1-r5 are undefined;
r6-r14 are unchanged; and The PSR is unchanged
The basic definition of the dispatch structure is:

```
typedef struct sHFSWIDispatch
{
    U32 p1;         // 0: SWI Argument r2
    U32 p2;         // 4: SWI Argument r3
    U32 p3;         // 8: SWI Argument r4
    U32 p4;         // 12: SWI Argument r5
    void* handler;  // 16: SWI Trap Handler (program) address
} tHFSWIDispatch;
```

Accordingly, the dispatch code for the SWI trap is trivial:

```
_hf_ArmAbortSWI:
    ; r0 = dispatch structure address
    ; r1 = function specific parameter
    ldmia r0, {r2-r5, pc} // Load parameters and jump to handler
```

Since only a single instruction is needed for the dispatch, this can be written directly in to the ARM SWI Vector, avoiding the need for one additional pipeline break due to the branch instruction that would normally reside there. It should be noted that, if this is done, there is no scope to perform any kind of error checking before dispatching the ldmia instruction. Error checking may desirable to increase system stability in the face of application coding errors. This may be done either by adding the checking to the code sequence that dispatches the SWI or by using additional instructions in the SWI handler itself.

The simplest way to ensure robustness is to place all tHF-SWIInterface structures in memory that is protected from write access by user-mode code, preventing the application from corrupting fields. If all such structures are allocated from a single contiguous area, validity checking can be a single range and alignment test on the supplied tHFSWIDispatch address. Individual trap handlers are called with the following parameters:

r0=address of the dispatch structure
r1=function specific parameter from application
r2-r5=p1-p4 from the dispatch structure
r6-r12 are undefined and must be preserved
r13 is a scratch register (not a stack pointer)
r14 is the return address
The PSR is set to SVC mode, non-Thumb mode, with both IRQ and FIQ disabled The trap handlers must preserve the registers noted above. A handler may not issue any system calls and must be written to be executed in a very short time since all interrupts are locked out. The trap handler must not change the interrupt enabled for SVC state. A trap handler should return with a movs pc, lr // Return from SWI instruction, to restore the caller's execution environment.

Interfaces and Messaging Via SWI Traps

The message and interface handling subsystem of Quantum™ was specifically designed to offer the best possible performance while executing application code in a non-privileged state. Interfaces are widely used by a variety of different Quantum™ objects, such as tasks, free buffer pools and interrupt sources. The design of the object system used by Quantum™ specifically places the burden to implement polymorphism on the actual object implementors, typically using a simple function indirection. This is extremely well suited to the model of SWI dispatch processing supported by Quantum™, where it is possible to push the polymorphism of the interface to the very lowest level of implementation and so achieve the best possible performance. All interfaces provide the following three basic operations:

1. "Put" a message on an interface;
2. "Wait" for a message to arrive at an interface (blocking call); and
3. "Get" a message from an interface (non-blocking call).

Different implementations of these functions are needed depending on the specialization of the interface.

The Interface Control Structure and SWI Traps

The following base structure is used to define an interface:

```
typedef struct sHFInterface
{
    U32 reserved;    // 0: Currently unused
    void* tail;      // 4: Message or task queue list tail
    S32 control;     // 8: Queue control word (see text)
    void* head;      // 12: Message or task queue list head
    void* pfPut;     // 16: SWI handler for put functions
    void* pfWait;    // 20: SWI handler for wait functions
    void* pfGet;     // 24: SWI handler for get functions
    // Other non-SWI specific fields can be placed here
} tHFInterface;
```

Figure 13:
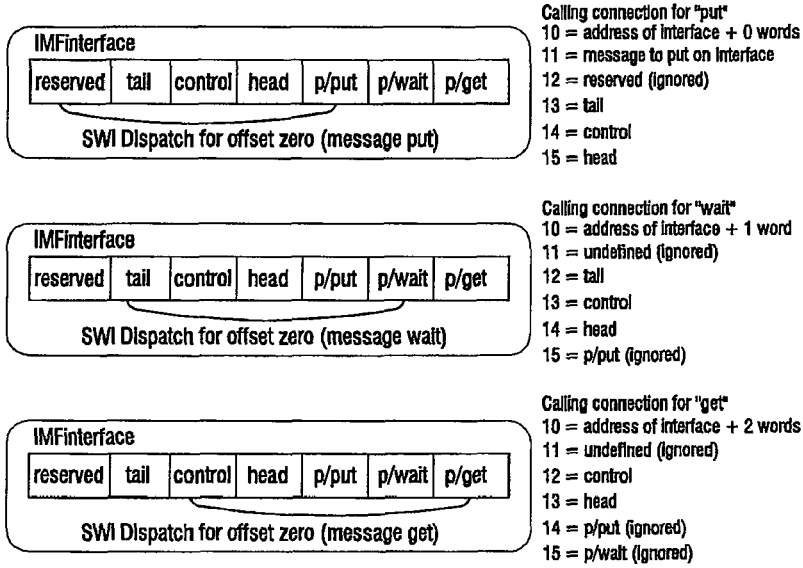
FIG. 13 illustrates a interface mapping structure of the present invention.

This is used to implement a FIFO queue of either messages or tasks waiting for messages. The control word is zero if no messages are present and no tasks are waiting, positive and non-zero if messages are present, and negative and non-zero if one or more tasks are waiting for a message to arrive. Message queues are always implemented as FIFOs: put operations add to the end of a queue, while get or wait operation remove from the head. This structure can be mapped to a SWI dispatch structure, selecting between the three required functions simply by adjusting the base pointer to use an offset of zero for 'put', one word for 'wait' and two words for 'get'. Referring to FIG. 13, there is shown one exemplary manner of mapping an interface structure to an SWI dispatch structure in accordance with the present invention. As shown, for a 'put' function, the offset is 0 words, for the 'wait' function, the offset is 1 word and for the 'get' function, the offset is 2 words.

With these conventions, the application code sequences used to perform the three basic functions are simple:

```
_hs_InterfacePut:
    ; r0 = interface address
    ; r1 = message address
    stmfd sp!, {r4-r5, lr} // Save work registers
    swi 0 // Run the put function in the interface
    ldmfd sp!, {r4-r5, pc} // Return
_hs_InterfaceWait:
    ; r0 = interface address
    stmfd sp!, {r4-r5, lr} // Save work registers
    add r0, r0, #4 // Run the wait function (a word is 4 bytes)
    swi 0 //
    ldmfd sp!, {r4-r5, pc} // Return, with r0 set from the SWI handler
_hs_InterfaceGet:
    ; r0 = interface address
    stmfd sp!, {r4-r5, lr} // Save work registers
    add r0, r0, #8 // Run the get function
    swi 0 //
    ldmfd sp!, {r4-r5, pc} // Return, with r0 set from the SWI handler
```

Note that the SWI trap handlers will corrupt r4 and r5, violating the ARM APCS-32 function calling conventions.

In the above examples, these registers are preserved on the caller's stack. However, a more efficient implementation still is to use inline assembler instructions to inline the actual SWI dispatch within the application C code. With this approach, only one or two ARM assembler instructions are needed to dispatch the interface function, using the C compiler extensions to mark the corrupted registers as 'invalid' following the assembler sequence. The approach works well with the register usage optimizations performed with modern compilers such as GNU's GCC. Also note that the 'get' function is not directly passed the tail pointer for the queue. This is not necessary since the 'get' operation always removes from the list head.

Task and Message Queues

Figure 14:
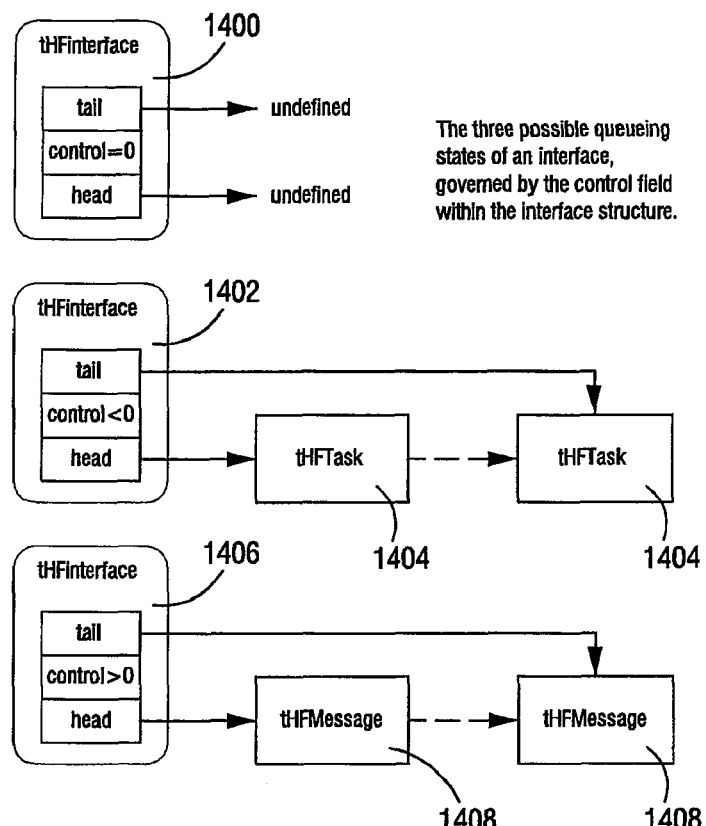
FIG. 14 is a block flow diagram illustrating multiple queuing states.

An interface may hold either a queue of tasks waiting for messages to arrive, or a queue of messages waiting for a task to get a message. The control word denotes whether the interface contains a list of tasks or a list of messages:

zero=>no tasks or messages queued
positive=>one or more messages are waiting
negative=>one or more tasks are waiting Referring now to FIG. 14, there are shown exemplary linked list structures for interface queue formation. As described above, for an instance 1400 where the control word is zero, no messages or tasks are in the queue. For an instance 1402 where the control word is positive, the queue includes tasks 1404 waiting for execution. Lastly, for an instance 1406 where the control word is negative, the queue includes messages 1408 waiting for a task. Using this basic structure, it is simple to provide an efficient implementation of the interface functions.

Interface 'put' operations always increment the control word. If the word was negative, the head pointer references a task control block in to which the message handle can be directly written (normally to the saved state for r0), before removing the task from the queue and making it runnable. If the control word was positive, the message is simply added to the end of the queue. Interface 'get' operations are a trivial queue manipulation. 'Get' operations only return messages, so if the control word is zero or negative, the operation must return the invalid message handle. A 'get' operation needs access only to the control word and list head. Interface 'wait' operations attempt to perform a trivial get, but if no messages are present, the control word becomes negative and the task is appended to the queue of waiting tasks and suspended.

The Quantum™ Warp Engine

Figure 15:
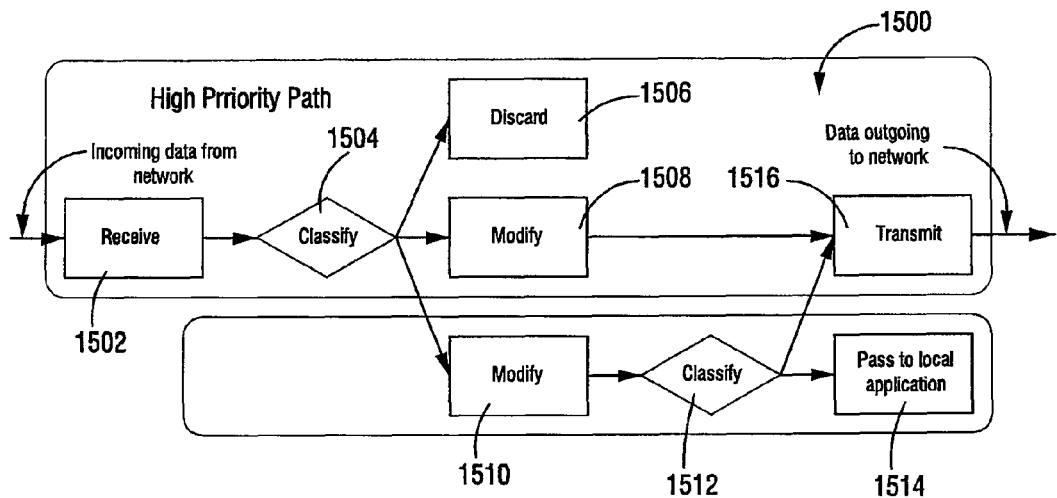
FIG. 15 is a flow diagram illustrating one embodiment of a network data flow.

The Quantum™ Warp engine is an extension of the present operating system for providing low-level system support for constructing function call chains to permit data path processing performance optimizations for network data handling. The need for the a new network data path API is driven by the need for increased performance and flexibility from network device drivers and protocol elements. The network data path can be modeled as a sequence of self-contained processing operations of two forms: classification and modification. FIG. 15 illustrates one possible network data flow 1500 in such a system.

The example of FIG. 15 shows the basic processing of data either being forwarded (bridged or routed) or terminated locally (such as for a Web based management tool). It should be noted that this is a simple case, since only a single network input or output port is shown, and there are only two priority levels: real systems will have potentially many more.

A network data-path priority represents both the importance and the urgency of data handling. This may be reflected in assignment of buffer memory resources and in the assignment of processing time. Incoming data will typically always enter the processing chain at the highest possible priority as shown in item 1502. Classification is then used in item 1504 to downgrade data handling for specific packets—and in extreme cases discard low priority data in the event of memory or CPU starvation. Upon classification, the data is either discarded in item 1506, modified in item 1508 at the current priority level, or modified in item 1510 at a lowered priority level. For lower priority data, it is again classified in item 1512 and either passed to a local application in 1514 or transmitted on the network at item 1516. High priority data is simply transmitted at item 1516. On hardware platforms with several receive ports, each port may be assigned a different initial processing priority (in this manner, the port at which data arrives is itself a form of classification, though it is outside of the system described here).

In such a system, the classification and modification elements may be implemented in many diverse forms. In some cases, dedicated hardware may perform some of the tasks. On others, software running on a dedicated network processor may contribute. Some or all of the software may be written in a portable language such as C or C++, and run on a single monolithic CPU along with all of the management and control software that typically abounds in such systems. There is only one certainty: there will be a tension between the demands of performance, portability, partitioning between hardware and software, ease of development, and the robustness of the final product.

Warp Modules

A Quantum™. Warp Module implements part of the data path for a full system. An individual module is characterized by the following:

Simple self contained processing operation
Zero or one network data inputs
Zero, one or more network data outputs; and
A generalized management and status interface The same basic module object is used to implement both classification and modification operations on the data path. This allows hybrid operations for optimum performance or to allow for constraints on the use of dedicated hardware blocks.

Figure 16:
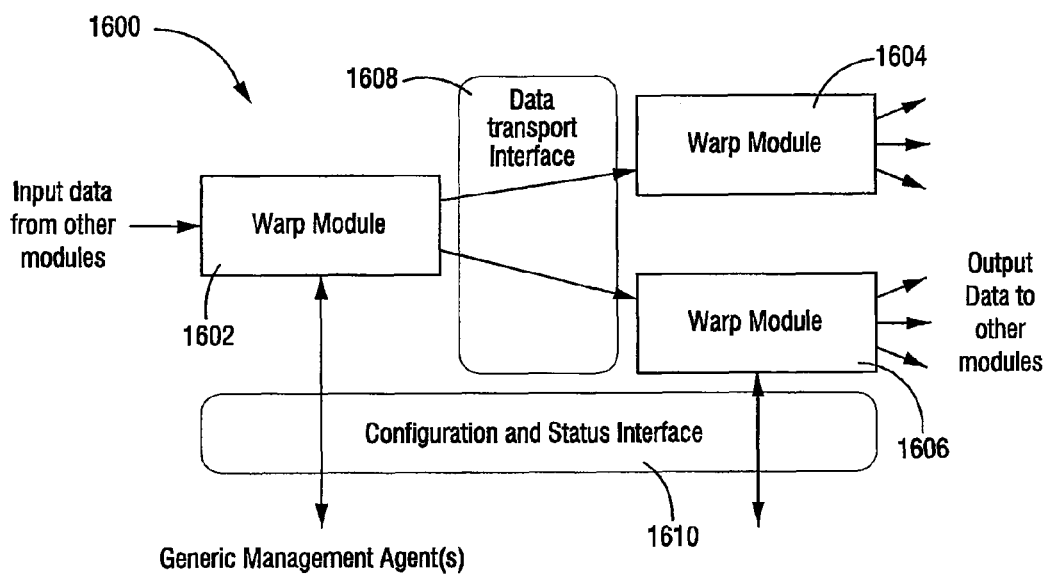
FIG. 16 is a block diagram illustrating a data transport system having three linked warp modules.

Typically, the processing performed by a single module is very simple—such as performing a packet classification based on a field in an IP header or performing a simple LLC/SNAP encapsulation. A high performance data path is coupled with a slower and more general configuration and status interface. The diagram of FIG. 16 illustrates one example of a system 1600 having three linked modules, 1602, 1604 and 1606. A data transport interface 1608 is provided for performing high performance data flow. Additionally, a configuration and status interface 1610 is provided for supporting generic management. Real systems will also have modules with zero inputs (reading data directly from a hardware interface, generating data locally, or connecting to an application such as a telnet program), and modules with zero outputs (throwing data away or passing data to a hardware device).

Warp Module Data Path Connections

The data path connection between Warp Modules is constrained by the following:

Extremely critical to performance;
A desire to enforce module encapsulation;
The need to transparently handle QoS branching; and
The need to support multiple-output streams from a module.

Best performance is generally achieved by directly connecting modules by a simple function call interface. This is the approach used by the original BUN device driver framework and ATIC based software. Encapsulation of a module typically means that a given module must not be aware of the modules that may precede or follow it. A given module must also have the ability to use private per-data flow context information, per flow configuration and status information.

QoS (quality of service) branching means that a direct function call binding between two modules may be broken to defer handling of a given data item either to a later time or to a different (lower priority) execution context or thread. Support for multiple output streams is required to support classification. A generic mechanism is needed so that a module can pass data to an appropriate output connection. Quantum™ Warp approaches these problems by carefully defining the programmatic interfaces to a Warp Module. The general form of the data path handling functions of a module is:

```
// MyModuleDataIn ( )
//
// A given module must implement this function. The function is called
// from the Warp framework to supply data to the module.
// Two arguments are passed:
//
//      warpcon - Quantum Warp's data flow control data
//      message - A Quantum message providing the data
//      mycon - My provide data for this data flow
//
// The module must process the data as shown in the following classification
// example
//
void MyModuleDataIn(tASWarpContext warpcon, tASMessage message,
void* mycon)
{
    // Look at the packet to determine an output channel number.
    // The 'MyClassify( )' function uses the message and local context
    // to determine an output port number.
    int output = MyClassify(message, mycon);
    // Pass the message to the output.
    as_WarpDataOut(warpcon, message, output);
}
```

Quantum™ manages the sets of context data for each module. The routine as WarpDataOut( ) handles the multiplexing and automatically ensures that the next module is able to access its own private per-flow context data. Quantum™ always provides an output of index zero to denote termination of the processing chain with a discard of the data message. Modules should not simply free a message that is to be discarded, but should set the message status code to indicate the reason for the discard and pass the message to output zero. As an alternative to as WarpDataOut( ) a module may use the call as WarpDataSuspend( ) to temporarily suspend processing of a given data messages. This will typically be used if a message has been passed to a hardware unit (such as an NP or DMA engine) and the call chain can not proceed until the external unit has completed. Note that as WarpDataSuspend( ) does not save the current call chain state.

Figure 17:
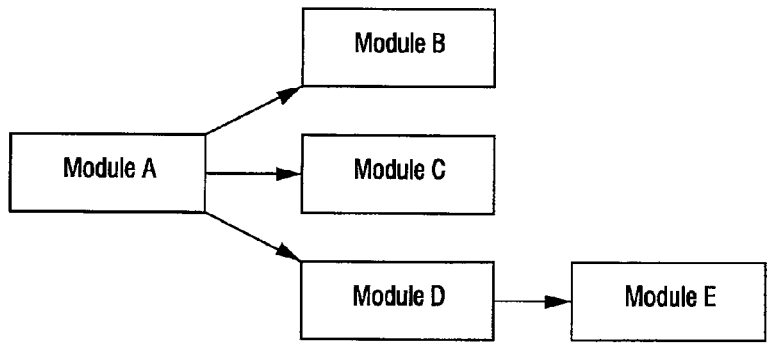
FIG. 17 is a block diagram illustrating one manner of linking warp modules in accordance with the present invention.

The software managing the external hardware unit is responsible for resuming the call chain processing. This is reasonable, since the typical action on completion of such processing will typically just release the message. To implement such a scheme, Quantum™ must build a tree structure describing the possible pathways that a message may take. The tASWarpContext type is used to manage the call chain and output multiplexing. The Warp context passed to successive modules will be different. Consider the following configuration of modules. FIG. 17 simplistically illustrates one possible module configuration, while FIG. 18 illustrates the warp tree of structures and references corresponding to such a configuration.

The term mux is used to refer to the links between modules. Although muxes are typically used programmatically as output connections by driver software, they are in fact bindings combining input and output information from two modules.

There will be one such structure for each possible data flow on the system, where a data flow is any logically distinct set or ordered data messages (e.g., data received on a single VCI, Ethernet frames targeted at a specific MAC address, etc).

Figure 18:
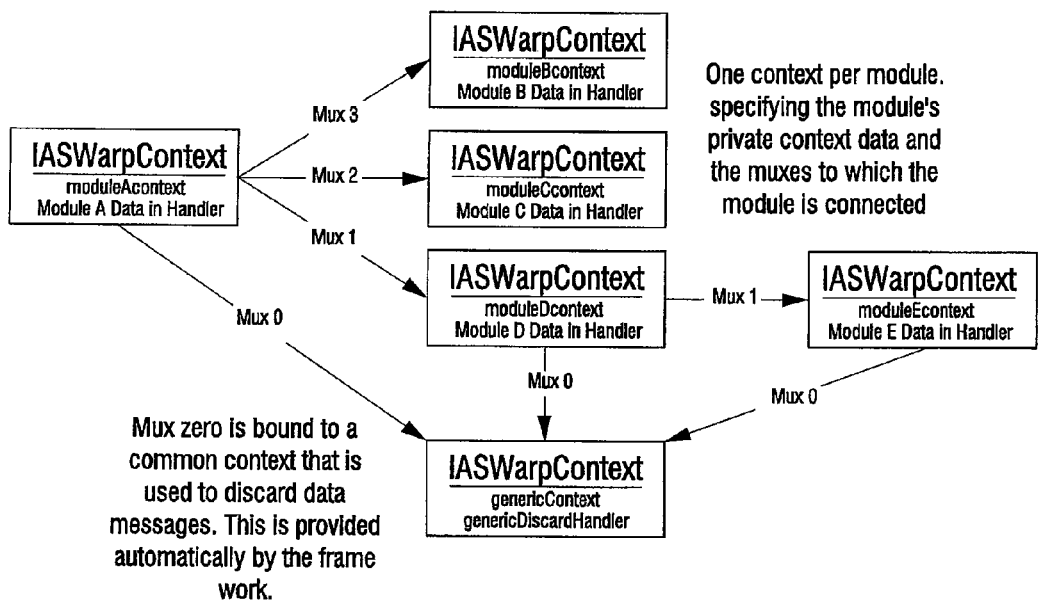
FIG. 18 is a block flow diagram illustrating one embodiment of a warp tree structure corresponding to the warp module embodiment of FIG. 17.

The tASWarpContext objects of FIG. 18 are used to contain the context information for each module, its currently data-in handler, and the permissible outputs bound to that module. Such a system can be implemented as a linked list, however, significant performance improvements can be found by constructing call chains using blocks of contiguous memory, tightly coupled to the C procedure call standard for the host CPU. The following structure may be used to implement context state for an ARM platform:

```
struct sASWarpContext
{
    U32 mux_count;                  // Number of muxes
    struct sASWarpExit* exit;       // Reference to the exit structure (see later)
    U32 reserved1;                  // Pad header to align mux objects to
    U32 reserved2;                  // a cache line boundary
    struct
    {
        struct sASWarpContext* pWarpContext;   // Warp context object
        void* pModuleContext;                  // Module private context
        void (*pfDataInHandler)( );            // Module data-in handler.
        U32 reserved;                          // Unused - pad size
                                               // to 2^n words
    } mux[ ];    // Variable length array of muxes
};
typedef sASWarpContext* tASWarpContext;
```

The corresponding implementation for the function as WarpDataOut( ) is:

```
_as_WarpDataOut:
//      On entry:
//          r0 = current tASWarpContext address
//          r1 = message handle
//          r2 = output index
    ldr     r11, [r0], #16          // Read count of muxes and point
                                    //     at first
    add     r3, r0, r2, lsl #2      // Compute address of output struc-
                                    //     ture
    cmp     r2, r3                  // Range check output index
//      If the mux index is valid, execute the next handler.
//      On entry, the handler is passed:
//          r0 = new tASWarpContext address
//          r1 = message handle (as passed in to this code)
//          r2 = the private context for the next module
//      This matches the APCS-32 calling standard for C using
//      tail recursion for the function chaining.
    ldmlsia r3, {r0, r2, pc}        // Jump to handler
//      If here, the supplied mux index is out of range. This
//      indicates a software problem - it's better to trap this
//      than simply crash. The trap handler is entered with:
//          r0 = tASWarpContext associated with the faulty module
//          r1 = message handle
//          r2 = faulty mux index
    sub     r0, r0, #16             // Adjust pointer back to
                                    //     tASWarpContext
    b       _as_WarpDataOutTrap     // Jump to trap handler
```

Figure 19:
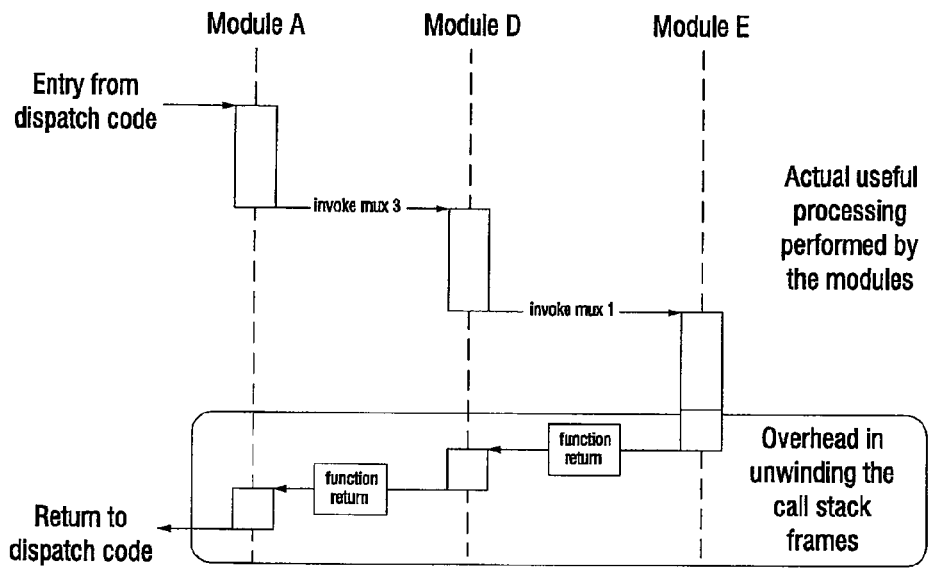
FIG. 19 is a diagram illustrating one embodiment of a call sequence for three linked warp modules.

A problem with such a code sequence is that it can not easily be inlined without changing the underlying C compiler support. Normally, a compiler will generate function pre-and-post-amble code sequences that save work registers on a stack. It can be difficult to persuade a compiler to perform tail-recursion so that the stack frame is deleted before the code for as WarpDataOut( ) is invoked. If the compiler won't perform tail recursion, the following call sequence results for a data message running though modules A, D and E. One example of a call sequence through modules A, D, and E is diagrammatically illustrated in FIG. 19.

This can be simplified by simply resetting the stack frame information at the point of chaining. The stack is simply a work space, with one work space per execution thread, and the stack pointer can simply be reset back to the start on each module entry. The following extension to the above ARM examples illustrate such a scheme where the stack pointer is saved in each output structure. This replicates the stack reference in many laces and makes the output structure specific to the actual task that executes the code. However, in practice this isn't a problem, since the software that constructs the chain of tASWarpContext objects has to understand this information anyway.

```
struct sASWarpContext
{
    U32 mux_count;              // Number of muxes
    struct sASWarpExit* exit;   // Reference to the exit structure (see later)
    U32 reserved1;              // Pad header to align mux objects to
    U32 reserved2;              // a cache line boundary
    struct
    {
        struct sASWarpContext* pWarpContext;  // Warp context object
        void* pModuleContext;                 // Module private context
        int* stack;                           // Stack to use in the handler
        void (*pfDataInHandler)( );           // Module data-in handler
    } mux[ ];                                 // Variable length array of mux definitions
};
typedef sASWarpContext* tASWarpContext;
```

The corresponding implementation for the function as WarpDataOut( ) is:

```
_as_WarpDataOut:
    // See the previous example for calling parameters. The
    // only change here is that the stack pointer is loaded
    // prior to invoking the next module.
    ldr       r11, [r0], #16           // Read count of muxes and point at
                                       //  first
    add       r3, r0, r2, lsl #2       // Compute address of output structure
    cmp       r2, r11                  // Range check output index
    ldmlsia   r3, {r0, r2, sp, pc}     // Invoke handler, resetting the stack
                                       //  pointer
    sub       r0, r0, #16              // Adjust pointer back to
                                       //  tASWarpContext
    b         _as_WarpDataOutTrap      // Handle out of range output index
```

Figure 20:
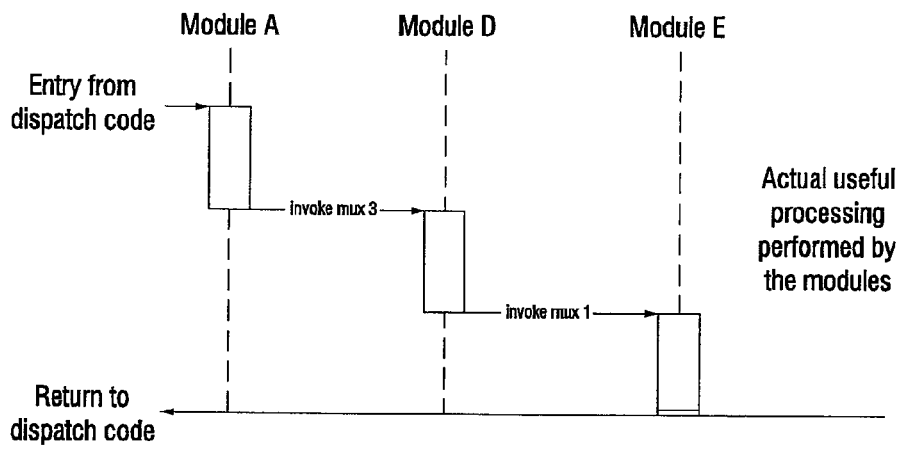
FIG. 20 is a diagram illustrating a second embodiment of a call sequence for three linked warp modules.

The resulting call sequence is diagrammatically illustrated in FIG. 20.

The modified scheme adds one cycle of overhead to the output dispatch code, but removes the unwinding of the call stack and can also improve efficiency by re-using the same area of stack for each module to given improved use of the CPU's data cache. In effect, the invocation of as WarpDataOut( ) becomes a specialized form of the C language return statement, forcing tail recursion, automatically handling module chaining with support for private module data, and all without need to modify the C or C++ compiler tools. This discussion does not describe the actual invocation of the module call chain. This will typically either be from a standard C or C++ code wrapper, in which case the calling code will need to save the original stack reference prior to entering the call chain (which must itself use a different stack to avoid overwriting data owned by the caller). One alternative is to dispatch natively from a specialized form of Quantum™ task that is dedicated to executing code in warp modules. Such a system is discussed in detail below, in the section entitled Implementing QoS: Multithreading.

An ARM code sequence that could be used to invoke a call chain can be implemented by adding a wrapper module to the end of the call chain. The sole purpose of the last module is to directly implement the function return:

```
// r0 = initial tASWarpContext
// r1 = message handle
// r2 = initial module context
ldr     r3, [r0, #4]          // Get pr to the sASWarpExit structure
stmia   r3, [sp, pc]          // Save return state information
add     r0, r0, #16           // Invoke initial handler using mux #0
ldmia   r0, {r0, r2, sp, pc}  //
// Code resumes from here when mux #0 is invoked on the
// final tASWarpContext object.
```

This assumes that the definition of tASWarpExit is simply:

```
struct sWarpExit
{
    int* stack; // Stack to restore
    int* lr; // Return program counter address
};
typedef struct sWarpExit* tWarpExit;
```

A reference to a single instance of the object is placed in each tASWarpContext so that any module can execute as WarpDataSuspend( ) the implementation of which is trivial:

```
_as_WarpDataSuspend:
    // On entry:
    //    r0 = tASWarpContext reference
    ldr r1, [r0, #4]           // Get reference to tASWarpExit
    ldmia r1, {sp, pc}         // Break call sequence
```

Again, this is easily inlined using most modern C compilers to give the best possible efficiency.

Implementing QoS: Multithreading

To implement quality of service for a given call sequence, it is useful to introduce a new Quantum™ task type. Traditional Quantum™ tasks are driven by the delivery of messages to interfaces. A message could be used to wrap up a call chain argument, so that call chains could be invoked or distributed between many distinct threads of execution.

A more efficient mechanism is, however, to make the fundamental scheduling control for the task the data necessary to invoke a call chain or fragment of such a chain.

To begin a data path call chain, only three things need to be known:

The target thread;

The message handle; and

The address of a mux object (within a tASWarpContext object).

A simple fixed size circular buffer may be used by the handler for an implementation of data-in handler that is dispatched from a mux and which wishes to defer execution to another thread. This in turn is tightly coupled to a specialized Quantum™ task, referred to as a Warp Task. A warp task control block containing such a FIFO might have the following form:

```
struct sHSWarpFifoEntry
{
    void* message;              //The message being passed
    void* mux;                  //The mux used to process the
                                  message
};
struct sHSWarpFifo
{
    struct sHSWarpFifoEntry* start;     // Start address of FIFO
    struct sHSWarpFifoEntry* end;       // End address of FIFO
    struct sHSWarpFifoEntry* read;      // Read pointer
    struct sHSWarpFifoEntry* write;     // Write pointer
    struct sHSWarpFifoEntry entries[n]; // Fixed size array of entries
};
struct sHSWarpTask
{
    struct sHSWarpFifo fifo; // Request FIFO
    ... other task state and context ...
};
```

A warp task receives CPU time only while it is processing data from its input FIFO. It's main loop will look something like:

```
_as_WarpTaskMainLoop:
    // Passed:
    //
    // r0 = address of FIFO
    //
    mov     r8, r0              // Save address of FIFO
    ldmia   r8, {r4-r7}         // r4 = start, r5 = end, r6 = read,
                                   r7 = write
loop1:
    bl      _hs_WarpTaskWait    // Wait for data to arrive at the FIFO
loop2:
    ldmia   r6!, {r1, r2}       // Get first entry from read pointer
    cmp     r6, r5              // Handle FIFO wrap
    movge   r6, r4              //
    ldmia   r2, {r0, r2, sp, pc} // Invoke call chain
    // Call chain returns by branching here
_as_WarpTaskMainLoop_EndOfChain:
    str     r6, [r8, #8]        // Save updated read pointer in FIFO
    ldr     r7, [r8, #12]       // Get next write pointer
    cmp     r6, r7              // Anything more to do?
    bne     loop2               // Yes - immediate dispatch
    b       loop1               // No - sleep until something arrives
```

A different design of FIFO header will help, for example. To drive this, all that is needed is for the mux at the end of a module chain to simply drop the necessary information in to the appropriate FIFO. The simplest way to do this is to encode a specialized form of the previously described tASWarpExit structure using the module specific parameter (an alternative would be to encode this information in each and every mux object—which is slightly faster but more wasteful of memory). The following structure can be used:

```
struct sWarpExitThreaded
{
    struct sHSWarpTask* task;   // Warp task to use
    void* mux;                  // Mux to invoke
    int* stack;                 // Stack to restore
    int* lr;                    // Return program counter address
};
typedef struct sWarpExitThreaded* tWarpExitThreaded;
```

The corresponding code for, invoked as if it was a call to the data-out handler of a normal processing module (see the dispatch code) is simply:

```
_as_WarpDeferDataOut:
    // On entry:
    //      r0 = target warp task
    //      r1 = message handle
    //      r2 = context pointer, referencing a tASWarpThreadExit object
    ldmia   r2, {r4-r5, sp, lr}     // r4 = task, r5 = mux, reset sp and get
                                       return address
    ldmia   r4, {r6-r9}             // r6 = start, r7 = end, r8 = read,
                                       r9 = write
    stmia   r9!, {r1, r5}           // Add message and mux to warp
                                       task's FIFO
    cmp     r9, r7                  // Handle wrap-around
    movge   r9, r7                  //
    cmp     r8, r9                  // Check for overflow
    beq     _as_WarpDeferTrap       // Trap overflows (see text)
    str     r9, [r4, #12]           // Save updated write pointer
    bl      _as_WakeWarpTask        // Magic glue to ensure warp task
                                       is running
    mov     pc, lr                  // Exit thread call sequence
```

This code is equivalent to as WarpDataOutSuspend( ) but passes the call chain to the specified task before completing. Note that the fixed size of the warp task's input FIFO may pose a problem. Overflow must be checked for and handled appropriately. Although no sample overflow code is given, it is fairly straightforward to implement an overflow trap handler that simply notes the failure and releases the message. If such overflow is deemed a problem, it is reasonable to size the input FIFOs for the task such that no FIFO is smaller than the total number of network data messages that are present in the system (typically a few hundred messages at most).

Figure 21:
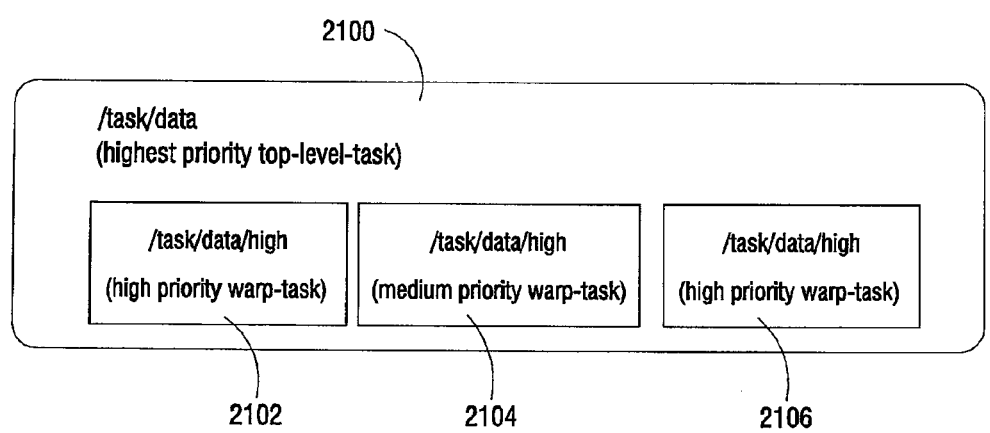
FIG. 21 block diagram illustrating one embodiment of a task/subtask priority structure of the present invention.

Warp tasks will need to be constructed as sub-tasks of a single data-path handling task. One embodiment of such task and sub-task structure is shown in FIG. 21 and implementing four priorities. The top level task 2100, /task/data, is implemented as a standard Quantum™ task using the normal message APIs. Other tasks in the system may send data messages directly to this task by simply using the as_Message-Send( ) API. This task implements the highest priority processing for the data path, directly running the function call chain in response to a message delivered from another task on the system. The embodiment of FIG. 21 also shows three sub-tasks, 2102, 2104 and 2106. These are shown embedded in the top level task since they share memory and resources. Sub-tasks are, however, executed independently of each other and any higher level tasks under Quantum™. Each may have its own distinct set of Quantum™ scheduler QoS parameters. Processing is deferred from any task to a lower priority one using the mechanisms outlined in this document.

Such a scheme means that the data path driver code always runs in the context of one of these tasks. Module code must therefore be structured as a shared library. Note that the information stored in the tASWarpContext and related data structures is intimately tied to the structure of these tasks and the priority at which processing is performed. If it is desirable to implement parallel threading, where parallel threads execute at the same priority, duplicate call chains must be constructed for each execution path (this may be desirable if, for example, a given thread processing chain needed to perform blocking calls and you do not want to stop all processing at that priority until the specific block has been released).

Enhancing Module Performance: Selectors

Many driver modules may wish to perform different processing actions based on some rarely changing configuration.

For example, an encryption module may offer both DES or 3DES modes. Typically, this would be handled with the following code sequence:

```
if (mode==DES)
{
// DES code here
}
else if (mode==DES3)
{
// 3DES code here
}
```

This imposes run-time overhead for a module property that changes only rarely. A better solution is for a driver module to export a number of different processing functions—e.g.:

void myDataIn_DES(tASWarpContext warpcon, tASMesssage message, void* mycon); void myDataIn_DES3 (tASWarpContext warpcon, tASMesssage message, void* mycon);

Since the implementation of the call chains used by Quantum™ warp contains a reference to the function used to perform packet processing by the module, it is trivial to provide an API that allows a module to change the data-in function that it has registered, typically in response to a configuration change to the module itself.

Module Configuration and Status Access

The present application does not specify a particular mechanism used to configure warp modules. However, the generic attribute mechanisms supported by BUN provide a good reference point as to the design of a generic attribute API to support module configuration and status. Exposing these APIs to control Warp Modules and their data streams would maximize code re-use, while also providing system level management for object access (to handle issues such as multiple-clients referencing the same object, when someone decides that it should be deleted).

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for managing shared resources in a computer system, comprising:
   establishing and registering a plurality of objects in response to requests from hardware or software associated with the computer system, the objects including at least one type, at least one attribute, and a handle;
   establishing a plurality of message pool objects, wherein the plurality of message pool objects comprise pools of free messages that can be allocated;
   manipulating the plurality of objects to effect processing and exchange of information;
   receiving, at a message pool interface, a request by a first task object through a first task object interface for a message allocation;
   allocating a message from a free message pool of the pools of free messages to the first task object;
   sending the message from the first task object through the first task object interface directly to a second task object through a second task object interface, wherein the message includes a message to arm an interrupt enabled in the second task object, the second task object including an interrupt object and the second task object interface including an interrupt interface;
   performing processing by the second task object in response to the received message, wherein the processing includes disabling an interrupt;
   returning the message by the second task object via the second task object interface, wherein returning further comprises one of the following:
   returning the message by the second task object through the second task object interface directly to the free message pool through the message pool interface upon completion of processing; and
   returning the message by the second task object through the second task object interface to the first task object through the first task object interface upon completion of processing in which the first task object through the first task object interface subsequently returns the message to the free message pool through the message pool interface.

2. The method of claim 1, further comprising:
   establishing a plurality of task objects;
   allocating messages from at least one free message pool object in response to requests from one or more task objects, wherein the messages include blocks of information that can be passed to other task objects;
   exchanging the messages between the plurality of task objects, thereby effecting requests for processing; and
   returning the messages to the free message pool object upon completion of processing.

3. The method of claim 2, further comprising:
   the plurality of task objects include at least a task type and an interface type, the interface type enabling request and release of messages; and
   the plurality of message pool objects include at least a pool type and an interface type.

4. The method of claim 2, wherein exchanging the messages between the plurality of task objects, thereby effecting requests for processing further comprises at least one of: putting a message to an interface, getting a message from an interface, and waiting for a message to arrive on an interface.

5. The method of claim 3, further comprising:
   receiving, at a message pool interface, a request by a first task object interface for a message allocation;
   allocating a message from the free message pool to the first task object;
   sending an arm interrupt message from the first task object interface to a interrupt object interface;
   disabling an interrupt with the arm interrupt message by the interrupt object; and
   returning the message to the first task object interface.

6. The method of claim 1, further comprising:
   defining a plurality of top-level tasks from the plurality of objects;
   providing each of the plurality of top-level tasks with a private memory resource; and
   enabling access of the private memory resource to any subtask created by a top-level task.

7. The method of claim 1, further comprising:
   allocating a memory space to a parent task;
   establishing at least one subtask to the parent task;
   enabling access of the memory space to the at least one subtask; and
   preventing access of the memory space to tasks not associated with the parent task.

8. The method of claim 7, further comprising:
   allocating a memory space to a subtask; and
   preventing access of the memory space to a parent task of the subtask.

9. The method of claim 1, further comprising:
establishing an object instance for each of the plurality of objects; and
establishing an object handle for each object instance, the object handle referencing a data structure used to implement the object instance.

10. The method of claim 9, wherein the object handle is a pointer value.

11. The method of claim 9, further comprising:
establishing at least one derived object type, based upon the object instance;
establishing object attributes for the at least one derived object type; and
accessing any established object attributes with the object handle.

12. The method of claim 11, further comprising appending data structures associated with the at least one derived object type to the data structure used to implement the object instance.

13. The method of claim 1, further comprising:
establishing an object instance for each of the plurality of objects;
establishing at least one derived object type, based upon the object instance;
establishing object attributes for the at least one derived object type; and
establishing an object handle for each derived object type, the object handles referencing a data structure used to implement the object instance.

14. The method of claim 1, further comprising:
organizing the plurality of objects as files in a global file system, wherein files in the system contain references to objects in memory; and referencing each of the plurality of objects in relation to a plurality of top level object types.

15. The method of claim 14, wherein the plurality of top level object types include tasks, interfaces, pools, mutexes, semaphores, interrupts, and memory.

16. A computer-readable storage medium incorporating one or more instructions, that when executed for a computer, causes the computer to manage shared resources in a computer system, comprising:
one or more instructions for establishing and registering a plurality of objects in response to requests from hardware or software associated with the computer system, the objects including at least one type, at least one attribute, a handle;
one or more instructions for establishing a plurality of message pool objects, wherein the plurality of message pool objects comprise pools of free messages that can be allocated; and
one or more instructions for manipulating the plurality of objects to effect processing and exchange of information;
one or more instructions for receiving, at a message pool interface, a request by a first task object through a first task object interface for a message allocation;
one or more instructions for allocating a message from a free message pool of the pools of free messages to the first task object;
one or more instructions for sending the message from the first task object through the first task object interface directly to a second task object through a second task object interface, wherein the message includes a message to arm an interrupt enabled in the second task object, the second task object including an interrupt object and the second task object interface including an interrupt interface;
one or more instructions for performing processing by the second task object in response to the received message receipt, wherein the processing includes disabling an interrupt;
one or more instructions for returning the message by the second task object via the second task object interface, wherein returning further comprises one of the following:
returning the message by the second task object through the second task object interface directly to the free message pool through the message pool interface upon completion of processing; and
returning the message by the second task object through the second task object interface to the first task object through the first task object interface upon completion of processing, in which the first task object through the first task object interface subsequently returns the message to the free message pool through the message pool interface.

17. The computer-readable storage medium of claim 16, the program further comprising:
one or more instructions for establishing a plurality of task objects;
one or more instructions for allocating messages from at least one free message pool object in response to requests from one or more task objects, wherein the messages include blocks of information that can be passed to other task objects;
one or more instructions for exchanging the messages between the plurality of task objects, thereby effecting requests for processing; and
one or more instructions for returning the messages to the free message pool object upon completion of processing.

18. The computer-readable storage medium of claim 17, the program further comprising:
one or more instructions for the plurality of task objects include at least a task type and an interface type, the interface type enabling request and release of messages; and
the plurality of message pool objects include at least a pool type and an interface type.

19. The computer-readable storage medium of claim 17, wherein the one or more instructions for exchanging the messages between the plurality of task objects, thereby effecting requests for processing further comprise at least one of: one or more instructions for putting a message to an interface, getting a message from an interface, and waiting for a message to arrive on an interface.

20. The computer-readable storage medium of claim 18, the program further comprising:
one or more instructions for receiving, at a message pool interface, a request by a first task object interface for a message allocation;
one or more instructions for allocating a message from the free message pool to the first task object;
one or more instructions for sending an arm interrupt message from the first task object interface to a interrupt object interface;
one or more instructions for disabling an interrupt with the arm interrupt message by the interrupt object; and
one or more instructions for returning the message to the first task object interface.

21. The computer-readable storage medium of claim 16, the program further comprising:
- one or more instructions for defining a plurality of top-level tasks from the plurality of objects;
- one or more instructions for providing each of the plurality of top-level tasks with a private memory resource; and
- one or more instructions for enabling access of the private memory resource to any subtask created by a top-level task.

22. The computer-readable storage medium of claim 16, the program further comprising:
- one or more instructions for allocating a memory space to a parent task;
- one or more instructions for establishing at least one subtask to the parent task;
- one or more instructions for enabling access of the memory space to the at least one subtask; and
- one or more instructions for preventing access of the memory space to tasks not associated with the parent task.

23. The computer-readable storage medium of claim 22, the program further comprising:
- one or more instructions for allocating a memory space to a subtask; and one or more instructions for preventing access of the memory space to a parent task of the subtask.

24. The computer-readable storage medium of claim 16, the program further comprising:
- one or more instructions for establishing an object instance for each of the plurality of objects; and one or more instructions for establishing an object handle for each object instance, the object handle referencing a data structure used to implement the object instance.

25. The computer-readable storage medium of claim 24, wherein the object handle is a pointer value.

26. The computer-readable storage medium of claim 24, the program further comprising:
- one or more instructions for establishing at least one derived object type, based upon the object instance;
- one or more instructions for establishing object attributes for the at least one derived object type; and
- one or more instructions for accessing any established object attributes with the object handle.

27. The computer-readable storage medium of claim 26, the program further comprising one or more instructions for appending data structures associated with the at least one derived object type to the data structure used to implement the object instance.

28. The computer-readable storage medium of claim 16, the program further comprising:
- one or more instructions for establishing an object instance for each of the plurality of objects;
- one or more instructions for establishing at least one derived object type, based upon the object instance;
- one or more instructions for establishing object attributes for the at least one derived object type; and
- one or more instructions for establishing an object handle for each derived object type, the object handles referencing a data structure used to implement the object instance.

29. The computer-readable storage medium of claim 16, the program further comprising:
- one or more instructions for organizing the plurality of objects as files in a global file system, wherein files in the system contain references to objects in memory; and
- one or more instructions for referencing each of the plurality of objects in relation to a plurality of top level object types.

30. The computer-readable storage medium of claim 29, wherein the plurality of top level object types include tasks, interfaces, pools, mutexes, semaphores, interrupts, and memory.

* * * * *